United States Patent [19]
Maegawa et al.

[11] Patent Number: 6,081,053
[45] Date of Patent: Jun. 27, 2000

[54] MOTOR

[75] Inventors: Hiroaki Maegawa, Machida; Chikara Aoshima, Zama, both of Japan

[73] Assignee: Canon Kabushiki Kaisha, Tokyo, Japan

[21] Appl. No.: 09/110,147

[22] Filed: Jul. 6, 1998

[30] Foreign Application Priority Data

Jul. 7, 1997 [JP] Japan ................................. 9-196543
Jul. 17, 1997 [JP] Japan ................................. 9-208561

[51] Int. Cl.⁷ .................................................. H02K 37/10
[52] U.S. Cl. ........................ 310/49 R; 310/156; 310/266
[58] Field of Search .................... 310/49 R, 254, 310/266, 49 A, 40 MM, 156, 164, 257; 29/596, 597, 598

[56] References Cited

U.S. PATENT DOCUMENTS

| | | | |
|---|---|---|---|
| 3,479,539 | 11/1969 | Brion ..................................... | 310/49 R |
| 4,754,183 | 6/1988 | Gerber .................................... | 310/156 |
| 5,384,506 | 1/1995 | Aoshima ............................... | 310/49 R |
| 5,410,200 | 4/1995 | Sakamoto et al. .................... | 310/49 R |
| 5,719,456 | 2/1998 | Kolomeitsev ......................... | 310/112 |
| 5,831,356 | 11/1998 | Aoshima . | |
| 5,844,346 | 12/1998 | Kolomeitsev et al. ................ | 310/254 |
| 5,925,945 | 7/1999 | Aoshima ............................... | 310/49 R |
| 5,945,753 | 8/1999 | Maegawa et al. ..................... | 310/49 R |

FOREIGN PATENT DOCUMENTS

| | | |
|---|---|---|
| 0 801 459 A1 | 10/1997 | European Pat. Off. . |
| 0 851 560 A1 | 7/1998 | European Pat. Off. . |
| 3180823 | 8/1991 | Japan . |

*Primary Examiner*—Nestor Ramirez
*Assistant Examiner*—Tran N. Nguyen
*Attorney, Agent, or Firm*—Fitzpatrick, Cella, Harper & Scinto

[57] ABSTRACT

A motor of an increased output is provided by forming a rotor, composed of a permanent magnet circumferentially divided into equal sections and alternately magnetized in different magnetic poles, in a cylindrical shape, positioning a first coil, the rotor and a second coil along the axial direction of the rotor, providing a first outer magnetic pole and a first inner magnetic pole, magnetized by the first coil, in opposed relationship, respectively, to the external and internal peripheries of the rotor, also providing a second outer magnetic pole and a second inner magnetic pole, magnetized by the second coil, in opposed relationship respectively to the external and internal peripheries of the rotor and positioning the first outer magnetic pole and the second outer magnetic pole in an axially opposed relationship with a mutual displacement by a predetermined phase angle, or forming the ends of the first and second outer magnetic poles in a tapered shape, thereby decreasing the leaking magnetic flux.

23 Claims, 16 Drawing Sheets

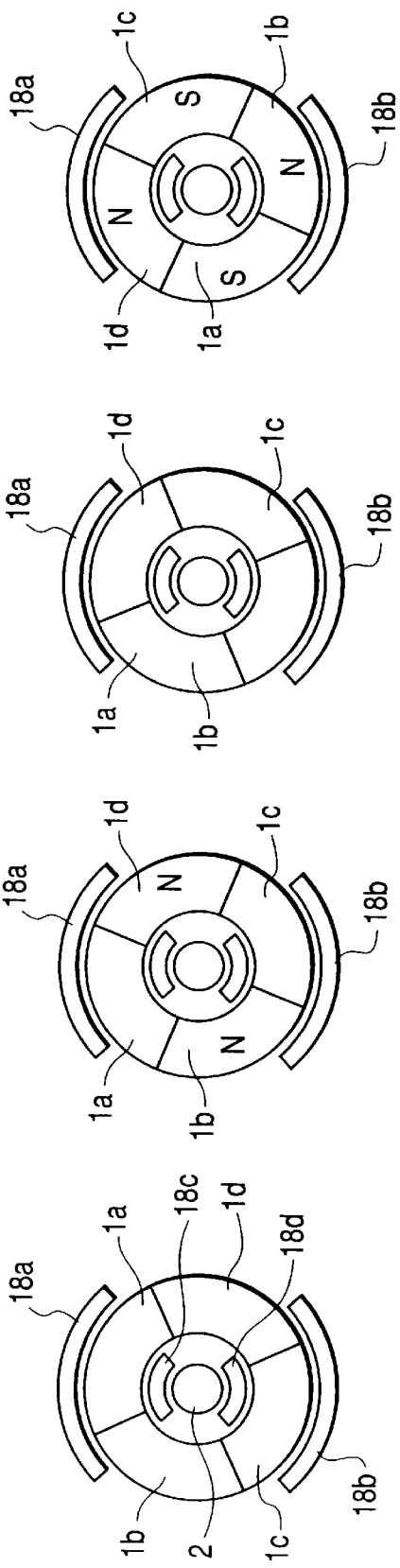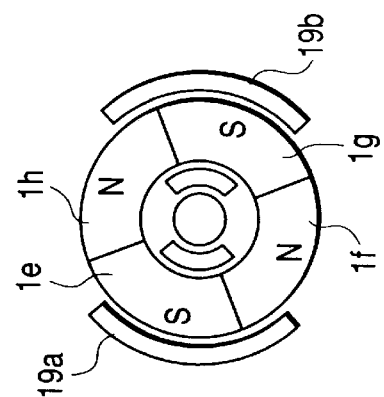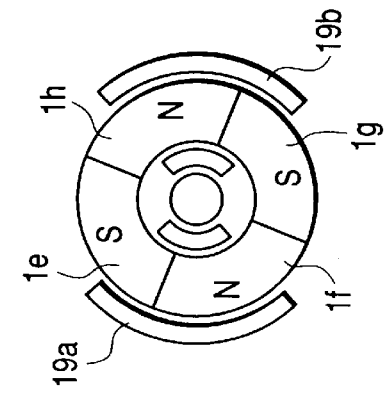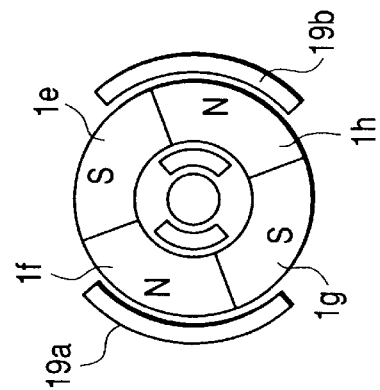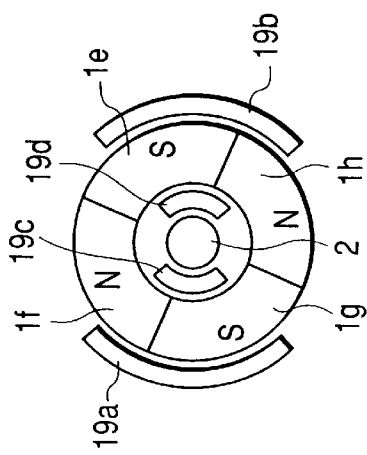

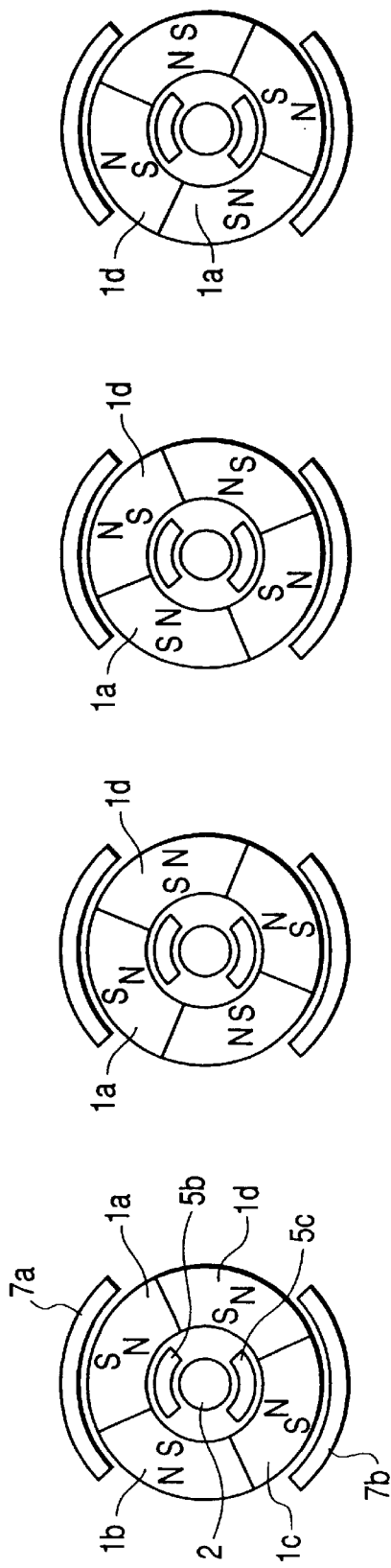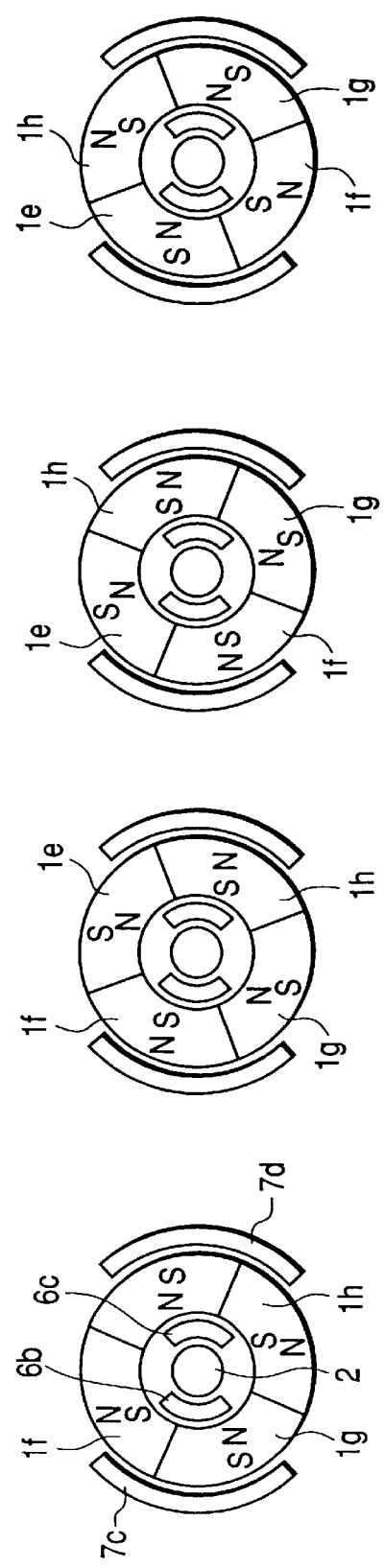

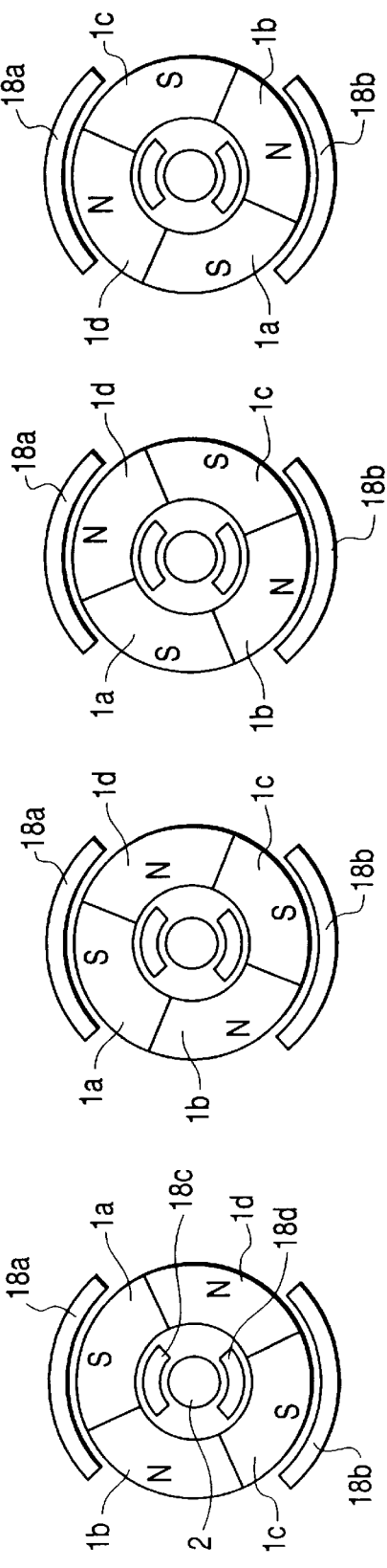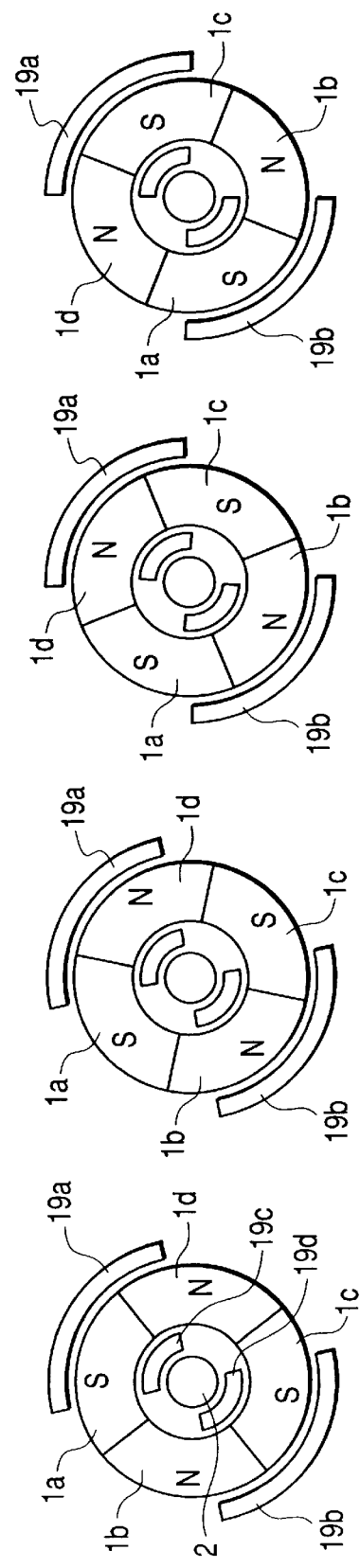

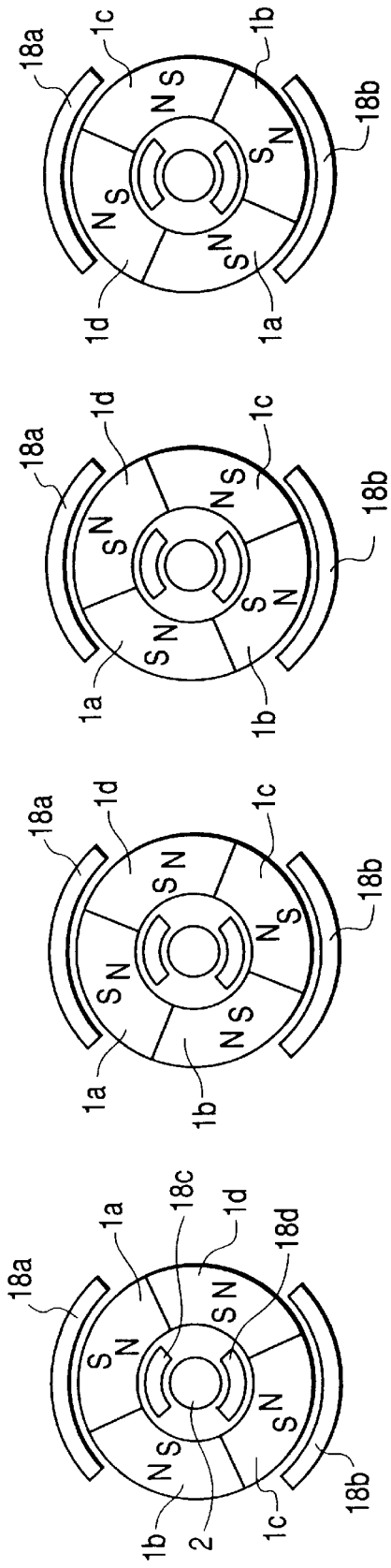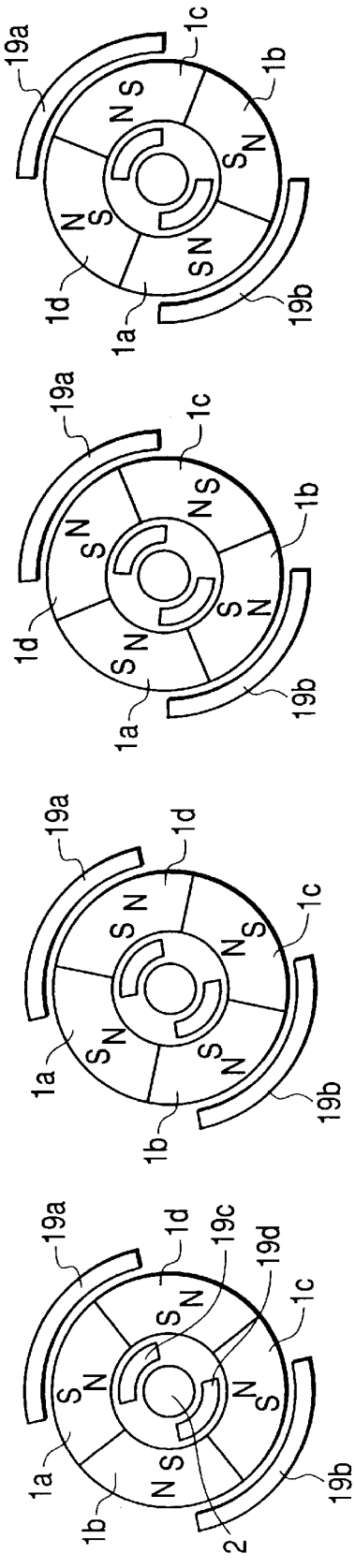

MOTOR

BACKGROUND OF THE INVENTION

1. Field of the Invention

The present invention relates to a motor capable of reducing the leaking magnetic flux by forming a gap of a large magnetic resistance in the mutually close portions of mutually opposed first and second external magnetic poles, thereby increasing the output.

2. Related Background Art

Among the conventional compact motors, there is known a compact cylindrical stepping motor as shown in FIG. 24. In such motor, a stator coil 105 is concentrically wound on a bobbin 101, which is axially sandwiched and fixed by two stator yokes 106. The stator yokes 106 are respectively provided with stator teeth 106a, 106b which alternate along the internal periphery of the bobbin 101, while the stator yoke 106 integral with the stator teeth 106a or 106b is fixed to a case 103 to constitute a stator 102.

A flange 115 and a bearing 108 are fixed to one of the two cases 103, while another bearing 108 is fixed to the other case 103. A rotor 109 is composed of a rotor magnet 111 fixed to a rotor shaft 110, and the rotor magnet 111 and the stator yoke 106a of the stator 102 define radial gaps. The rotor shaft 110 is rotatably supported between the two bearings 108.

A configuration employing such a compact stepping motor employed for driving a lens of a camera is known, for example in the Japanese Patent Laid-open Application No. 3-180823. In such a configuration, an arc-shaped stepping motor is provided around an image taking lens, and a female screw is driven by the output shaft of the stepping motor to displace a male screw, fixed to a lens holder supporting a lens, parallel to the optical axis.

However, the above-described conventional compact stepping motor is associated with the drawback that it has a large external dimension, since the case 103, the bobbin 101, the stator coil 105, the stator yoke 106, etc. are concentrically provided outside the rotor.

Also, as shown in FIG. 25, the magnetic flux generated by energization of the stator coil 105 passes through an end face 106a1 of the stator tooth 106a and an end face 106b1 of the stator tooth 106b and does not effectively act on the rotor magnet 111, so that the motor output is not elevated.

The present applicant has proposed a motor capable of resolving such a drawback in the U.S. patent application Ser. No. 08/831,863 (European Patent Application No. 97105567.8).

In the proposed motor, a cylindrical rotor consists of a permanent magnet circumferentially divided in equal sections and alternately magnetized, and a first coil, the rotor and a second coil are provided in succession in the axial direction of the rotor. A first external magnetic pole and a first internal magnetic pole, magnetized by the first coil, are respectively opposed to the external and internal peripheries of the rotor, while a second external magnetic pole and a second internal magnetic pole, magnetized by the second coil, are respectively opposed to the external and internal peripheries of the rotor, and a rotary rotor shaft is connected to the cylindrical permanent magnet.

The motor of the above-described configuration has a high output and a reduced external dimension, but the tooth-shaped magnetic poles are difficult to produce because of the limited diameter of the internal magnetic poles. Also, it is desired to obtain a stable output without vibration from the motor of a small diameter.

For this reason, the present applicant has recently proposed a motor with the internal magnetic poles of an easily produceable shape in the U.S. patent application Ser. No. 08/994,994 (European Patent Application No. 97122508.1), and a rotor enabling easy mounting of output transmission means, such as a gear or a pulley, on the rotary shaft of a small diameter, thereby providing a stable output without vibration, in the U.S. patent application Ser. No. 09/022,474.

It has further been desired to obtain a high-performance motor of an increased output by reducing the leaking magnetic flux based on the relationship of the first and second stators.

SUMMARY OF THE INVENTION

In consideration of the foregoing, an object of the present invention is to provide an ultra-compact, high-performance motor capable of increasing the output by reducing the leaking magnetic flux at the ends of the first external magnetic pole and the second external magnetic pole.

Another object of the present invention is to provide a motor capable of increasing the output by reducing the leaking magnetic flux, by mutually displacing the first external magnetic pole and the second external magnetic pole by a predetermined phase angle.

Still another object of the present invention is to provide a motor capable of increasing the output by reducing the leaking magnetic flux, by forming the ends of the first and second external magnetic poles into a tapered shape.

Still other objects of the present invention will become fully apparent from the following description of the embodiments.

BRIEF DESCRIPTION OF THE DRAWINGS

FIGS. 3A, 3B, 3C, 3D, 3E, 3F, 3G and 3H are views showing the rotating operation of the rotor of the motor shown in FIG. 1;

FIGS. 8A, 8B, 8C, 8D, 8E, 8F, 8G and 8H are views showing the rotating operation of the rotor of the motor shown in FIG. 7;

FIGS. 19A, 19B, 19C, 19D, 19E, 19F, 19G and 19H are views showing the rotating operation of the rotor of the motor shown in FIG. 17;

FIGS. 21A, 21B, 21C, 21D, 21E, 21F, 21G and 21H are views showing the rotating operation of the rotor of a motor constituting a sixth embodiment of the present invention;

DESCRIPTION OF THE PREFERRED EMBODIMENTS

Now the present invention will be clarified in detail by preferred embodiments thereof, with reference to the attached drawings.

[Embodiment 1]

Figure 1:
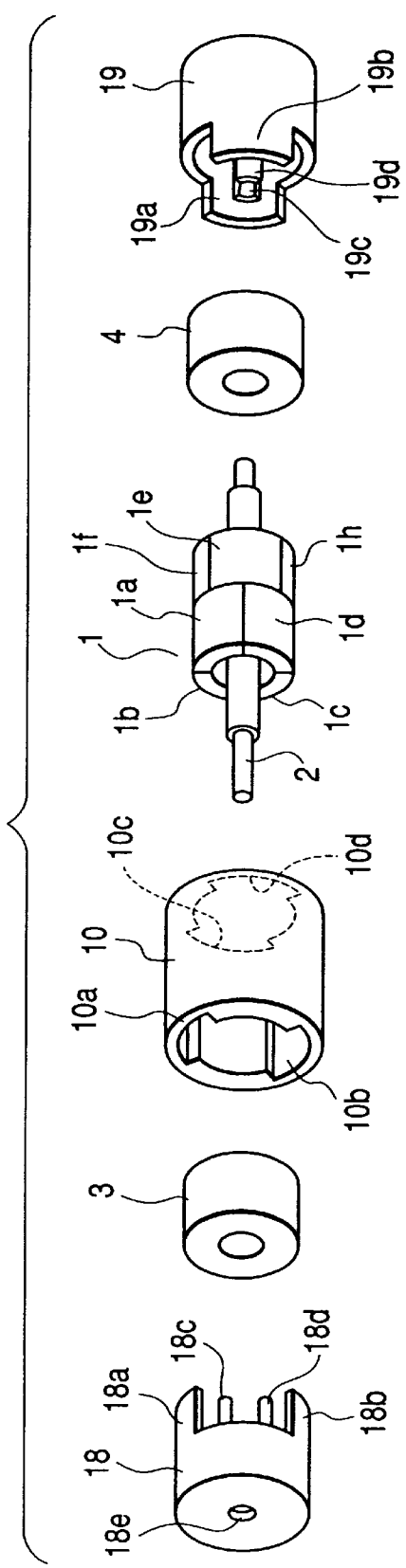
FIG. 1 is an exploded perspective view of a motor constituting a first embodiment of the present invention.
Figure 2:
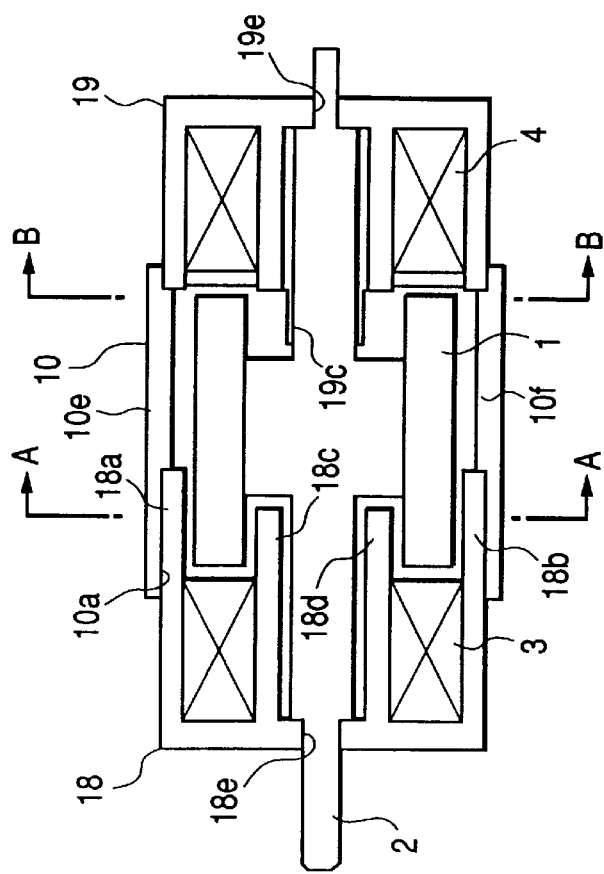
FIG. 2 is a cross-sectional view of the motor shown in FIG. 1 in the assembled state thereof.
Figure 4:
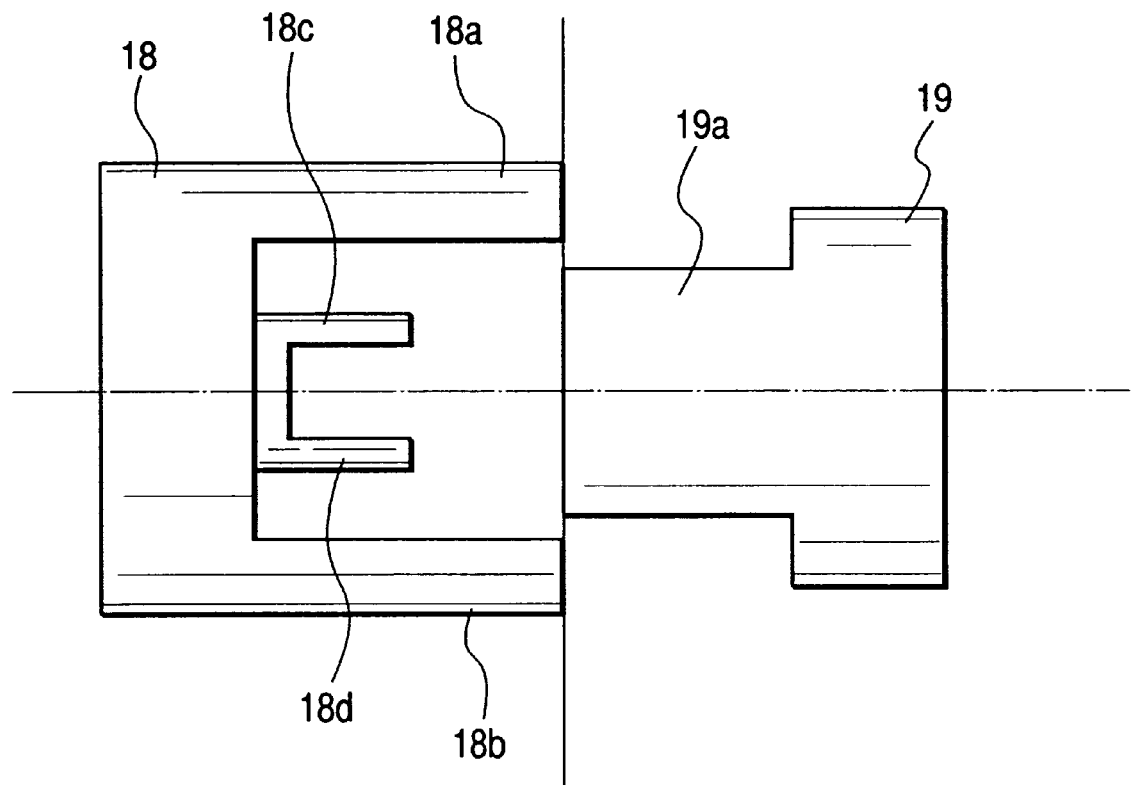
FIG. 4 is a magnified view of the stator of the motor shown in FIG. 1.
Figure 5:
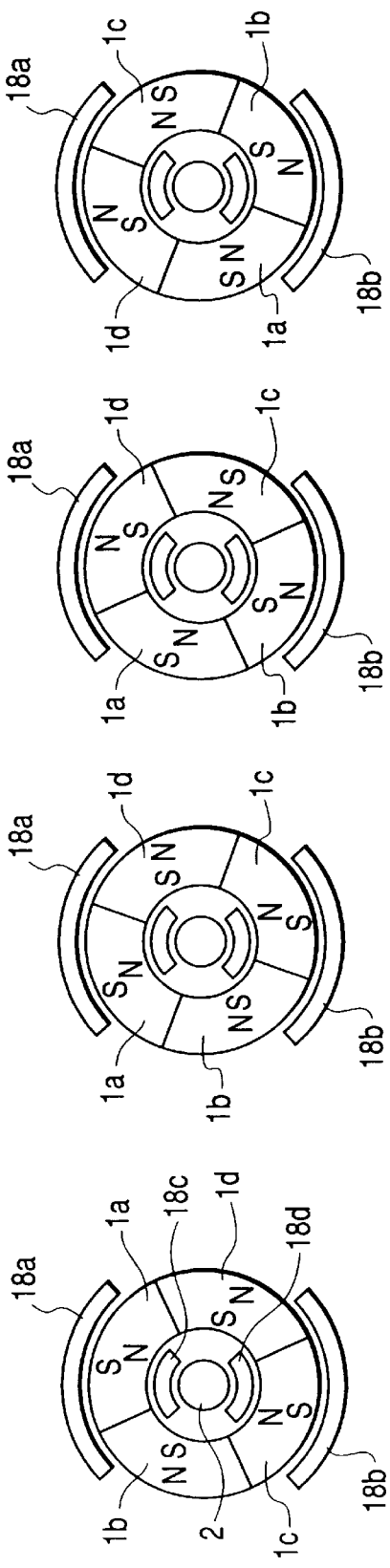
FIGS. 5A, 5B, 5C, 5D, 5E, 5F, 5G and 5H are views showing the rotating operation of the rotor of a motor constituting a second embodiment of the present invention.

FIGS. 1 to 4 illustrate a stepping motor constituting a first embodiment of the present invention, wherein FIG. 1 is an exploded perspective view of the stepping motor; FIG. 2 is an axial cross-sectional view of the stepping motor in the assembled state; FIGS. 3A to 3H are cross-sectional views along a line A—A or B—B in FIG. 2; and FIG. 4 is a lateral view showing the arrangement of certain specified components in the assembled state of the stepping motor.

Referring to FIGS. 1 to 4, a hollow cylindrical permanent magnet 1 constituting the rotor is provided with a first magnetized layer consisting of magnetized sections 1a, 1b, 1c, 1d formed by circumferentially dividing the external periphery into n sections (4 sections in the present embodiment) and alternately magnetizing such sections into S and N poles, and an axially adjacent second magnetized layer consisting of magnetized sections 1e, 1f, 1g, 1h formed by circumferentially dividing the external periphery into n sections (4 sections in the present embodiment) and alternately magnetizing such sections into S and N poles. The first magnetized layer and the second magnetized layer are mutually displaced in phase by 180°/n, or 45° in the present embodiment.

In the first magnetized layer, the magnetized sections 1a and 1c are magnetized as S poles, while the sections 1b and 1d are magnetized as N poles. In the second magnetized layer, the magnetized sections 1e and 1g are magnetized as S poles, while the sections 1f and 1h are magnetized as N poles.

A rotary shaft 2 constituting the rotor shaft is fixed to the permanent magnet 1, and the rotary shaft 2 and the permanent magnet 1 constitute the rotor. Cylindrical coils 3, 4 are provided concentrically with the permanent magnet 1 in positions axially sandwiching the permanent magnet 1, and have an external diameter substantially equal to that of the permanent magnet 1.

Each of first and second stators 18, 19 is composed of a soft magnetic material, has an outer tube and an inner tube, and is preferably formed by metal injection molding (MIM). Between the outer and inner tubes of the first stator 18, there is provided a coil 3, which magnetizes the first stator 18 when energized. The outer and inner tubes of the first stator 18 constitute, at the ends thereof, outer magnetic poles 18a, 18b and inner magnetic poles 18c, 18d which are mutually displaced by 360°/(n/2)=180° so as to assume the same phase. The outer magnetic pole 18a is opposed to the inner magnetic pole 18c, while the outer magnetic pole 18b is opposed to the inner magnetic pole 18d. The outer magnetic poles 18a, 18b and the inner magnetic poles 18c, 18d of the first stator 18 are so positioned as to respectively oppose the external and internal peripheries of an end of the permanent magnet 1. In a hole 18e of the first stator 18, an end of the rotary shaft 2 is rotatably fitted.

Between the outer and inner tubes of the second stator 19, there is provided a coil 4, which magnetizes the second stator 19 when energized. The outer and inner tubes of the second stator 19 constitute, at the ends thereof, outer magnetic poles 19a, 19b and inner magnetic poles 19c, 19d which are mutually displaced by 360°/(n/2)=180° so as to assume the same phase. The outer magnetic pole 19a is opposed to the inner magnetic pole 19c, while the outer magnetic pole 19b is opposed to the inner magnetic pole 19d. The outer magnetic poles 19a, 19b and the inner magnetic poles 19c, 19d of the second stator 19 are so positioned as respectively oppose to the external and internal peripheries of the other end of the permanent magnet 1. In a hole 19e of the second stator 19, the other end of the rotary shaft 2 is rotatably fitted.

A cylindrical connection ring 10 of a non-magnetic material is provided, at an end of the internal periphery, with grooves 10a, 10b, and, at the other end, with grooves 10c, 10d displaced in phase from the grooves 10a, 10b by 360°/n (90° in the present embodiment). The outer magnetic poles 18a, 18b of the first stator 18 are fitted in the grooves 10a, 10b while the outer magnetic poles 19a, 19b of the second stator 19 are fitted in the grooves 10c, 10d, and the fitted portions are fixed with an adhesive material, whereby the first stator 18 and the second stator 19 are mounted to the connection ring 10.

The first stator 18 and the second stator 19 are mutually so positioned that the ends of the outer magnetic poles 18a, 18b and of the inner magnetic poles 18c, 18d are displaced in phase from the ends of the outer magnetic poles 18a, 18b and of the inner magnetic poles 18c, 18d by 360°/n (90° in the present embodiment), and are mutually fixed by the connection ring 10 with a mutual distance corresponding to the width of internal projections 10e, 10f of the connection ring 10.

FIG. 2 is a cross-sectional view of the stepping motor, and FIGS. 3A to 3D are cross-sectional views along a line A—A in FIG. 2 while FIGS. 3E to 3H are cross-sectional views along a line B—B in FIG. 2. FIGS. 3A and 3E are views at a same timing; FIGS. 3B and 3F are views at another same timing; FIGS. 3C and 3G are views at still another same timing; and FIGS. 3E and 3H are views at still another same timing.

In the following there will be explained the function of the stepping motor of the present invention. Starting from a state shown in FIGS. 3A and 3E, the coils 3, 4 are energized to magnetize the outer magnetic poles 18a, 18b of the first stator 18 as N poles, the inner magnetic poles 18c, 18d as S poles, the outer magnetic poles 19a, 19b of the second stator 19 as S poles and the inner magnetic poles 19c, 19d as N poles, whereby the permanent magnet 1 rotates counterclockwise by 45° to assume a state shown in FIGS. 3B and 3F.

Then the current to the coil 3 is inverted to magnetize the outer magnetic poles 18a, 18b of the first stator 18 as S poles, the inner magnetic poles 18c, 18d as N poles, the outer magnetic poles 19a, 19b of the second stator 19 as S poles, and the inner magnetic poles 19c, 19d as N poles, whereby the rotor 1 further rotates counterclockwise by 45° to assume the state shown in FIGS. 3C and 3G.

Then the current to the coil 4 is inverted to magnetize the outer magnetic poles 19a, 19b of the second stator 19 as S poles, the inner magnetic poles 19c, 19d as N poles, the outer magnetic poles 18a, 18b of the first stator 18 as S poles, and the inner magnetic poles 18c, 18d as N poles, whereby the permanent magnet 1 further rotates counterclockwise by 45° to assume the state shown in FIGS. 3D and 3H. Thereafter the directions of the currents to the coils 3, 4 are similarly switched in succession, whereby the permanent magnet 1 rotates to positions corresponding to the phases of energization.

In the following there will be explained that the above-described configuration of the stepping motor is optimum for minimizing the dimension of the motor. The basic features of the stepping motor configuration are as follows:

1) the permanent magnet is shaped as a hollow cylinder;
2) the external periphery of the permanent magnet is circumferentially divided into n sections which are magnetized as alternately different magnetic poles;
3) the first coil, the permanent magnet, and the second coil are arranged in this order in the axial direction of the permanent magnet;
4) the outer and inner magnetic poles of the first and second stators, magnetized by the first and second coils, are respectively opposed to the external and internal peripheries of the permanent magnet; and
5) as shown in FIG. 4, the outer magnetic poles 18a, 18b of the first stator 18 and those 19a, 19b of the second stator 19 are mutually opposed in the axial direction with a mutual phase displacement of 360°/n (90° in the present embodiment), and the ends of the outer magnetic poles 18a, 18b of the first stator 18 and those of the outer magnetic poles 19a, 19b of the second stator 19 are positioned mutually close in the axial direction.

Consequently, the present stepping motor only requires a diameter sufficient for mounting the magnetic poles of the stators in a mutually opposed manner on the external diameter of the permanent magnet, and the axial length of the stepping motor is also limited to the length of the permanent magnet and that of the first and second coils. Consequently the dimension of this stepping motor is determined by the diameter and length of the permanent magnet and the coils, and the stepping motor can be ultra miniaturized by reducing such diameter and length of the permanent magnet and the coils to very small sizes.

In such a configuration, the closest points of the outer magnetic poles of the first stator magnetized by the first coil and of the outer magnetic poles of the second stator magnetized by the second coil are constituted by the edges of such magnetic poles. Consequently these points show an elevated magnetic resistance to reduce the leaking magnetic flux, whereby the first stator and the second stator individually form separate effective magnetic circuits to increase the output of the motor.

The precision of the output of the stepping motor is difficult to maintain when the diameter and the length of the permanent magnet and the coils are made very small, but such a drawback is avoided by a simple structure in which the permanent magnet is formed into a hollow cylinder and the outer and inner magnetic poles of the first and second stators are provided in a mutually opposed manner on the external and internal peripheries of the permanent magnet of such hollow cylindrical shape. In this configuration, the output of the motor can be further elevated by circumferentially magnetizing not only the external periphery but also the internal periphery of the permanent magnet as will be described in the following Embodiment 2.

[Embodiment 2]

FIGS. 5A to 5H show the rotating operations of a stepping motor constituting a second embodiment of the present invention. In the foregoing first embodiment, the external periphery of the permanent magnet 1 constituting the rotor is circumferentially divided into n sections which are alternately magnetized as S and N poles, but, in the present second embodiment, the permanent magnet 1 is divided, not only on the external periphery but also on the internal periphery, into n sections (4 sections in the present embodiment) and alternately magnetized S and N poles. In this configuration, the polarity of the internal peripheral section is opposite to that of the external peripheral section adjacent thereto, so that, for example, the internal periphery of the magnetized sections 1a, 1c is magnetized as an N pole while that of the magnetized sections 1b, 1d is magnetized as an S pole.

In the present second embodiment, since the permanent magnet 1 is circumferentially divided, not only on the external periphery but also on the internal periphery, into n sections which are alternately magnetized as S and N poles, the output of the motor can be increased by the interaction between the internal periphery of the permanent magnet 1 and the inner magnetic poles 18c, 18d of the first stator 18 and those 19c, 19d of the second stator 19.

[Embodiment 3]

In the following there will be described a stepping motor constituting a third embodiment of the present invention with reference to FIGS. 6 to 8H, in which components the same as those in the first embodiment shown in FIGS. 1 to 4 are represented by the same numbers. In the foregoing first embodiment, in each of the first and second stators 18, 19, the outer tube and the inner tube are integrally formed, but, in the present third embodiment, the outer tubes of the first and second stators 18, 19 are integrally formed as shown in FIG. 6 while the inner tubes of the first and second stators 18, 19 are separately formed.

Figure 6:
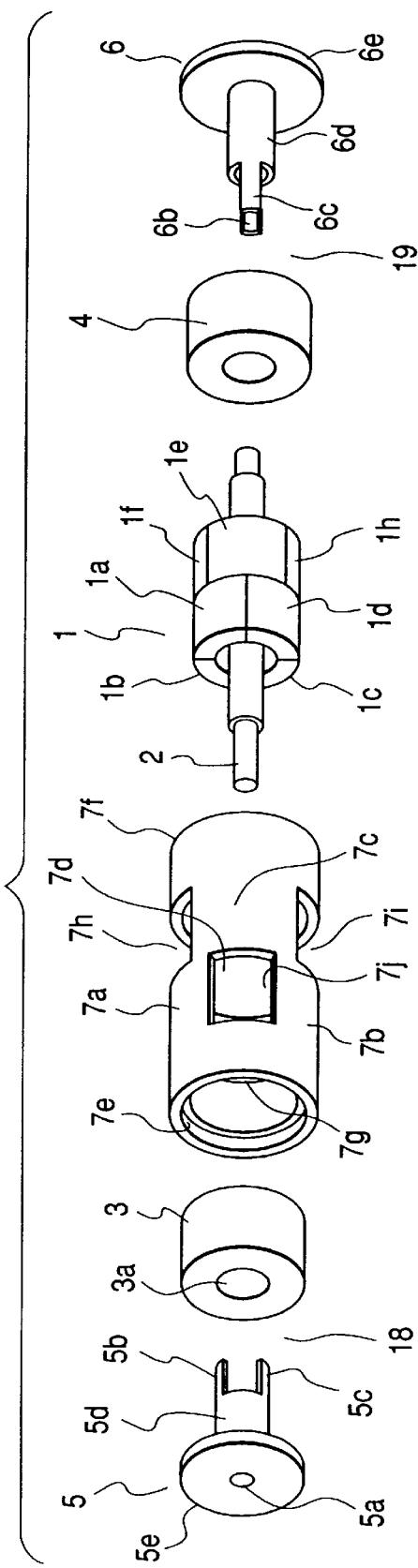
FIG. 6 is an exploded perspective view of a motor constituting a third embodiment of the present invention.
Figure 7:
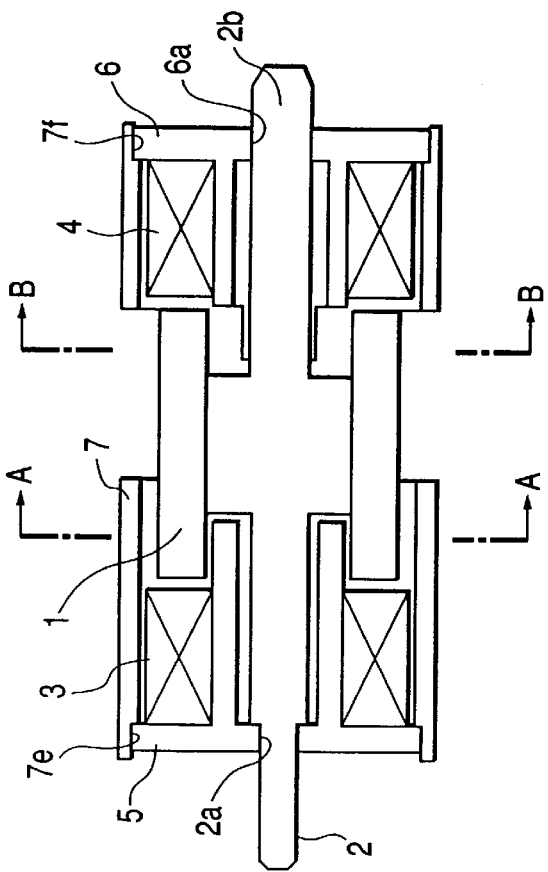
FIG. 7 is a cross-sectional view of the motor shown in FIG. 6 in the assembled state thereof.

FIG. 6 is an exploded perspective view of the stepping motor constituting the third embodiment of the present invention; FIG. 7 is an axial cross-sectional view of the stepping motor in the assembled state thereof; and FIGS. 8A to 8H are cross-sectional views along a line A—A or B—B in FIG. 7.

Referring to these drawings, a hollow cylindrical permanent magnet 1 is provided with a first magnetized layer consisting of magnetized sections 1a, 1b, 1c, 1d formed by circumferentially dividing the circumference into n sections (4 sections in the present embodiment) and alternately magnetizing such sections into S and N poles, and a second magnetized layer consisting of magnetized sections 1e, 1f, 1g, 1h formed by similarly dividing the circumference into 4 sections and alternately magnetizing such sections into S and N poles. The first magnetized layer and the second magnetized layer are mutually displaced in phase by 180°/n, or 45° in the present embodiment. In the present embodiment, the sections 1a, 1c of the first magnetized layer and those 1e, 1g of the second magnetized layer are so magnetized as to have an S pole on the external periphery and an N pole on the internal periphery, while the sections 1b, 1d of the first magnetized layer and those 1f, 1h of the second magnetized layer are so magnetized as to have an N pole on the external periphery and an S pole on the internal periphery.

A rotary shaft 2 is fixed to the permanent magnet 1, and the rotary shaft 2 and the permanent magnet 1 constitute the rotor. Coils 3, 4 are provided concentrically with the permanent magnet 1 in positions axially sandwiching the permanent magnet 1, and have an external diameter substantially equal to that of the permanent magnet 1. A first yoke 5 of a soft magnetic material is provided with a part 5d to be inserted into the interior 3a of the coil 3, and teeth 5b, 5c to be opposed to the interior of the first magnetized layer of the permanent magnet 1. The teeth 5b, 5c are mutually displaced by 360°/(n/2)=180° so as to assume the same phase with the poles of the first magnetized layer. A part 2a of the rotary shaft 2 is rotatably fitted in a hole 5a of the first yoke 5.

A second yoke 6 of a soft magnetic material is provided with a part 6d to be inserted into the interior 4a of the coil 4, and teeth 6b, 6c to be opposed to the interior of the second magnetized layer of the permanent magnet 1. The teeth 6b, 6c are mutually displaced by 360°/(n/2)=180° so as to assume the same phase with the poles of the second magnetized layer. A part 2b of the rotary shaft 2 is rotatably fitted in a hole 6a of the second yoke 6.

The insertion of the coils is facilitated since, in the first yoke 5, the coil inserted portion 5d and the teeth 5b, 5c have the same diameter, and, in the second yoke 6, the coil inserted portion 6d and the teeth 6b, 6c have the same diameter. The teeth 5b, 5c of the first yoke 5 and those 6b, 6c of the second yoke 6 are displaced, in the axial direction, by 360°/n, or 90° in the present embodiment. There is also provided a third yoke 7 of a soft magnetic material. Since the coils 3, 4 and the permanent magnet 1 have the substantially same external diameter, the third yoke is formed in a simple cylindrical shape that covers the external periphery of the coils 3, 4 and the permanent magnet 1 with a suitable gap.

The third yoke 7 is coupled, in a portion 7e, with a portion 5e of the first yoke 5, and, in a portion 7f, with a portion 6e of the second yoke 6. The third yoke 7 is further provided with portions 7a, 7b in positions opposed to the teeth 5b, 5c of the first yoke 5 across the permanent magnet 1, and portions 7c, 7d in positions opposed to the teeth 6b, 6c of the second yoke 6 across the permanent magnet 1, and is further provided with apertures 7g, 7h, 7i, 7j in other positions. As the teeth 5b, 5c of the first yoke 5 and those 6b, 6c of the second yoke 6 are mutually displaced by 90°, the magnetic pole portions 7a, 7c, 7d and 7b, 7c, 7d of the third yoke 7 to be opposed to these teeth can be prepared as a single cylindrical component by integrally connecting parts of the mutually close end faces as shown in FIG. 6, whereby a component with an increased and stable strength can be easily manufactured. Also, as the air gap between the first yoke 5 and the third yoke 7 and that between the second yoke 6 and the third yoke 7 are mostly filled with the permanent magnet 1, so that the magnetic flux generated by the energization of the coils 3, 4 effectively acts on the permanent magnet to increase the output.

FIG. 7 is a cross-sectional view of the stepping motor, while FIGS. 8A to 8D are cross-sectional views along a line A—A in FIG. 7 while FIGS. 8E to 8H are cross-sectional views along a line B—B in FIG. 7. FIGS. 8A and 8E are views at a same timing; FIGS. 8B and 8F are views at another same timing; FIGS. 8C and 8G are views at still another same timing; and FIGS. 8E and 8H are views at still another same timing.

In the following there will be explained the function of the stepping motor of the present invention. Starting from a state shown in FIGS. 8A and 8E, the coils 3, 4 are energized to magnetize the teeth 5b, 5c of the first yoke 5 as S poles, the portions 7a, 7b of the third yoke 7 opposed to the teeth 5b, 5c as N poles, the teeth 6b, 6c of the second yoke 6 as N poles, and the portions 7c, 7d of the third yoke 7 opposed to the teeth 6b, 6c as S poles, whereby the permanent magnet 1 rotates counterclockwise by 45° to assume a state shown in FIGS. 8B and 8F.

Then the current to the coil 3 is inverted to magnetize the teeth 5b, 5c of the first yoke 5 as N poles, the portions 7a, 7b of the third yoke opposed to the teeth 5b, 5c as S poles, the teeth 6b, 6c of the second yoke 6 as N poles and the portions 7c, 7d of the third yoke opposed to the teeth 6b, 6c as S poles, whereby the rotor 1 further rotates counterclockwise by 45° to assume a state shown in FIGS. 8C and 8G.

Then the current to the coil 4 is inverted to magnetize the teeth 6b, 6c of the second yoke 6 as S poles and the portions 7c, 7d of the third yoke 7 opposed to the teeth 6b, 6c as S poles, whereby the permanent magnet 1 further rotates counterclockwise by 45° to assume a state shown in FIGS. 8D and 8H. Thereafter the directions of the currents to the coils 3, 4 are similarly switched in succession, whereby the permanent magnet 1 rotates to positions corresponding to the phases of energization.

In the third embodiment of the present invention, the permanent magnet 1 constituting the rotor is circumferentially divided into n sections and alternately magnetized as S and N poles not only on the external periphery of the permanent magnet 1, but also on the internal periphery thereof, but it is also possible, in the third embodiment, to circumferentially divide only the external periphery into n sections and alternately magnetize such sections as S and N poles.

[Embodiment 4]

Figure 9:
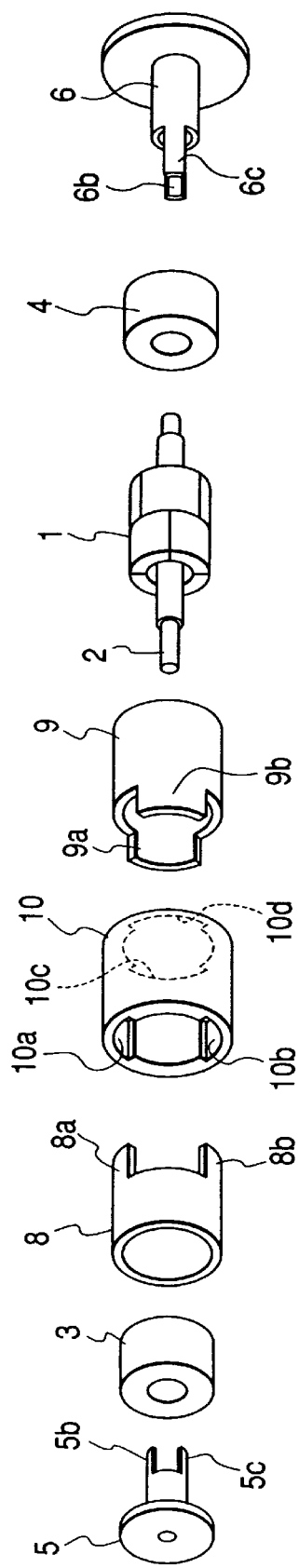
FIG. 9 is an exploded perspective view of a motor constituting a fourth embodiment of the present invention.
Figure 10:
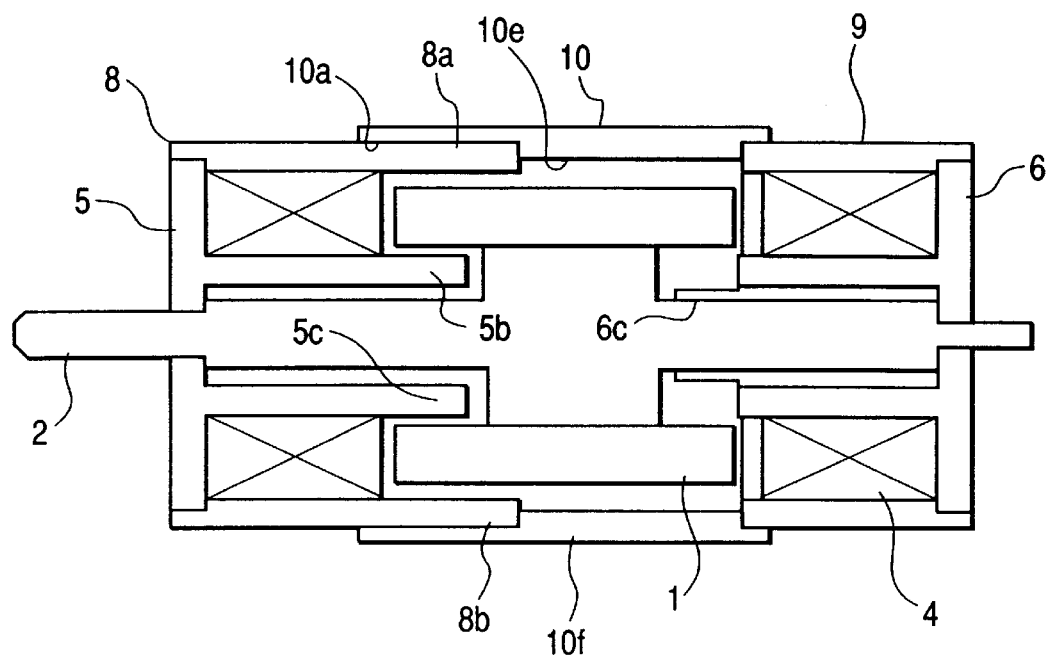
FIG. 10 is a cross-sectional view of the motor shown in FIG. 9 in the assembled state thereof.

FIGS. 9 and 10 are respectively an exploded perspective view and a cross-sectional view of a stepping motor constituting a fourth embodiment of the present invention. Referring to FIGS. 9 and 10, a first outer yoke 8 of a soft magnetic material is provided with teeth 8b, 8c in positions opposed to the teeth 5b, 5c of the first yoke 5 across the first magnetized layer of the permanent magnet 1. A second outer yoke 9 of a soft magnetic material is provided with teeth 9b, 9c in positions opposed to the teeth 6b, 6c of the second yoke 6 across the second magnetized layer of the permanent magnet 1. The first outer yoke 8 covers the coil 3 and the permanent magnet 1 with a suitable gap, while the second outer yoke 9 covers the coil 4 and the permanent magnet 1 with a suitable gap. The coil 3 can be assembled even when the first outer yoke 8 and the first yoke 5 are formed integrally, and the coil 4 can be assembled even when the second outer yoke 9 and the second yoke 6 are formed integrally. The integral formation of the first outer yoke 8 and the first yoke 5 or of the second outer yoke 9 and the second yoke 6 allows a precise phase relationship to be obtained between the teeth 8a, 8b and the teeth 5b, 5c or between the teeth 9a, 9b and the teeth 6b, 6c, thereby further increasing the output.

A connection ring 10 of a non-magnetic material is provided with grooves 10a, 10b in which the teeth 8a, 8b of the first outer yoke 8 are fitted and grooves 10c, 10d in which the teeth 9a, 9b of the second outer yoke 9 are fitted, and the first outer yoke 8 and the second outer yoke 9 are fixed by a known method, such as with an adhesive material. The first outer yoke 8 and the second outer yoke 9 are fixed with a predetermined distance, defined by internal projections 10e, 10f of the connection ring 10. The grooves 10a, 10b and those 10c, 10d of the connection ring 10 are mutually displaced by a phase of 360°/n (90° in the present embodiment), so that the teeth 8a, 8b of the first outer yoke 8 and the teeth 9a, 9b of the second outer yoke 9 are mutually opposed in the axial direction, with a mutual phase displacement angle of 360°/n (90° in the present embodiment).

The combination of the first outer yoke 8 and the second outer yoke 9 performs a function similar to that of the third yoke 7 in the third embodiment. Also, as shown in FIG. 10, the first outer yoke 8 is connected at an end thereof to the first yoke 5 and covers the external periphery of the coil 3, and the teeth 8a, 8b at the other end are opposed, with a predetermined gap, to the external periphery of the permanent magnet 1. Also, as shown in FIG. 10, the second outer yoke 9 is connected at an end thereof to the second yoke 6 and covers the external periphery of the coil 4, and the teeth 9a, 9b at the other end are opposed, with a predetermined gap, to the external periphery of the permanent magnet 1.

Figure 11:
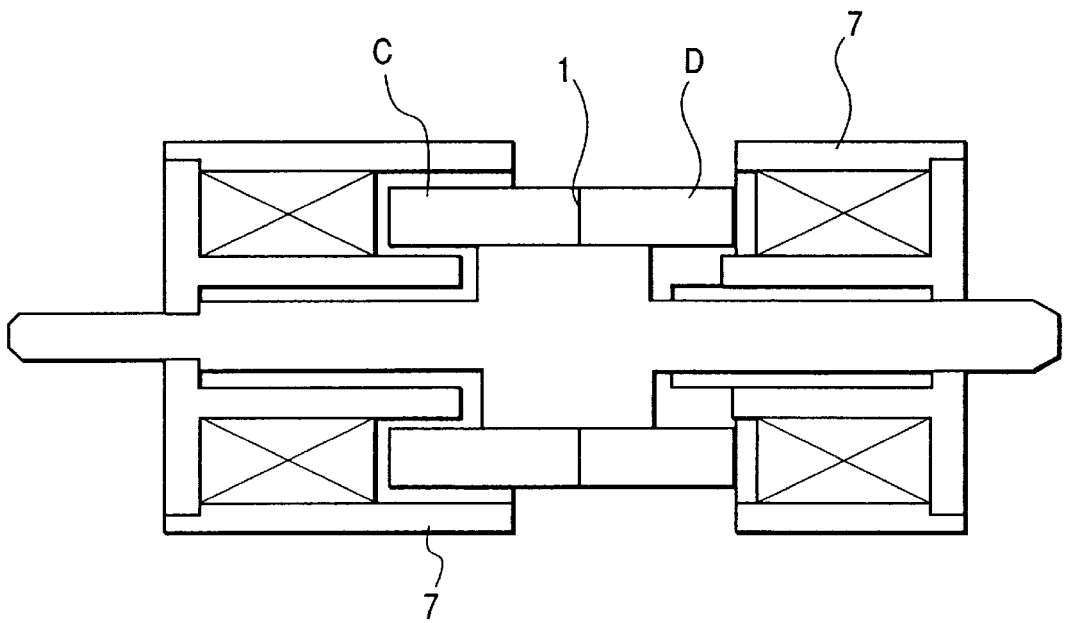
FIG. 11 is a cross-sectional view of the motor shown in FIG. 7, showing a comparison with the cross section of the motor shown in FIG. 10.
Figure 12:
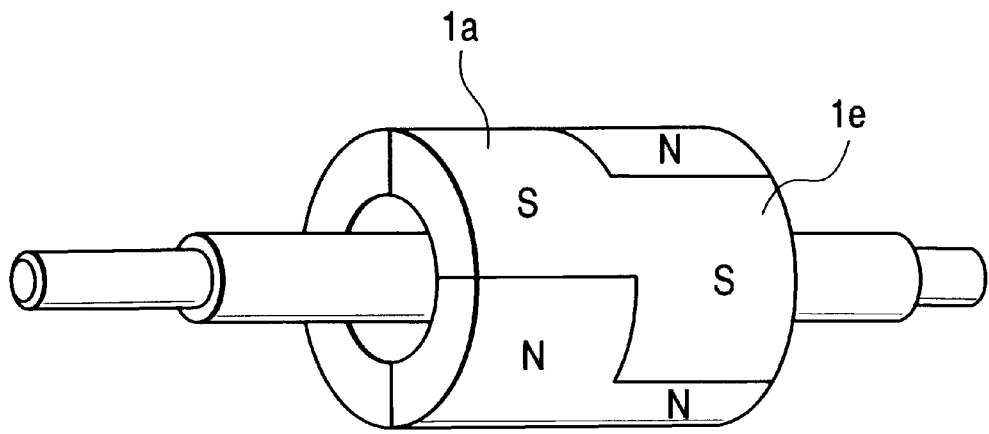
FIG. 12 is a magnified view of the rotor of the motor shown in FIG. 10.
Figure 13A:
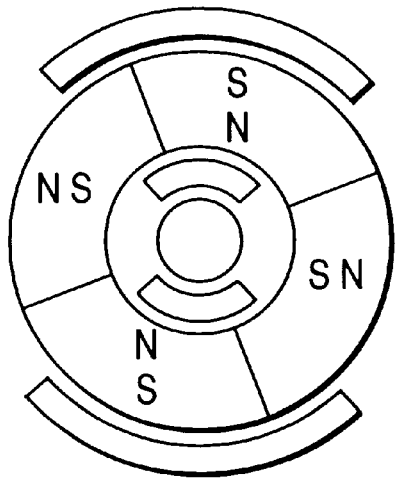
FIGS. 13A and 13B are views showing a first state of the relationship between first and second magnetized layers of the rotor and first and second yokes in the motor shown in FIG. 10.
Figure 13B:
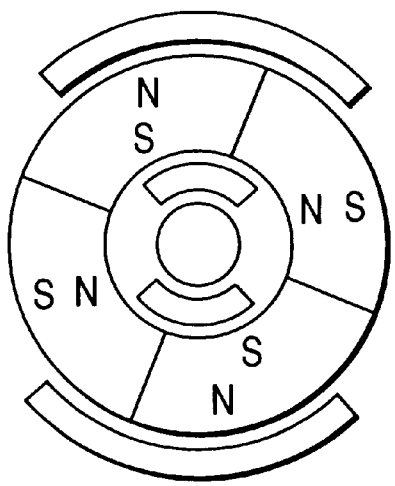
Figure 14A:
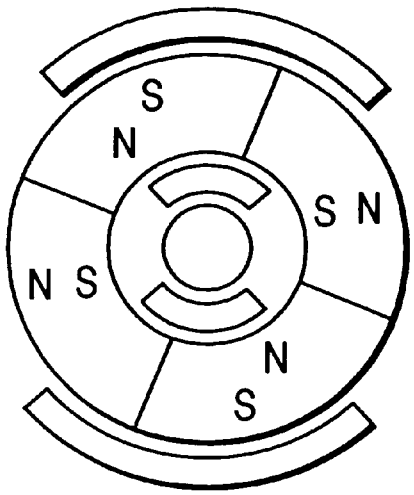
FIGS. 14A and 14B are views showing a second state of the relationship between the first and second magnetized layers of the rotor and the first and second yokes in the motor shown in FIG. 10.
Figure 14B:
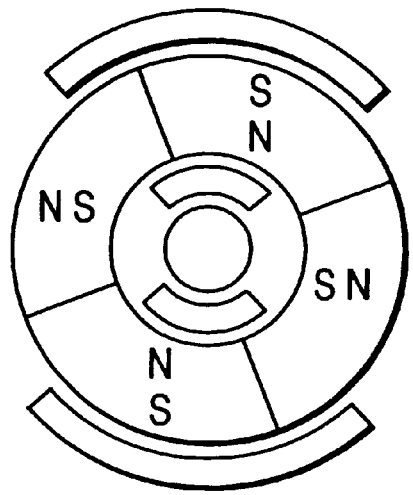
Figure 15A:
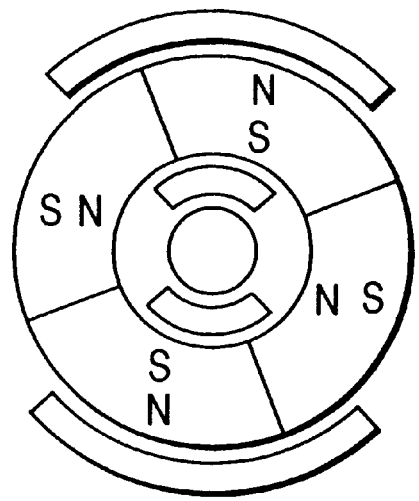
FIGS. 15A and 15B are views showing a third state of the relationship between the first and second magnetized layers of the rotor and the first and second yokes in the motor shown in FIG. 10.
Figure 15B:
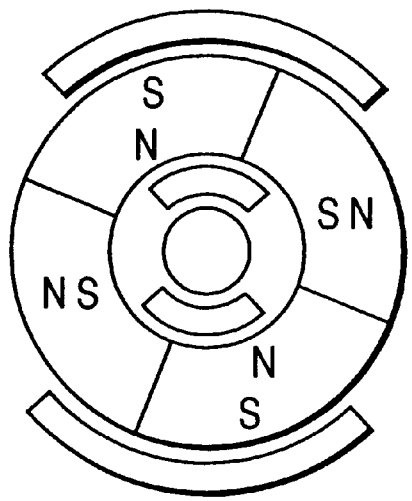
Figure 16A:
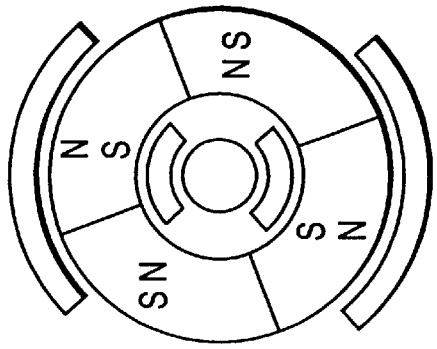
FIGS. 16A and 16B are views showing a fourth state of the relationship between the first and second magnetized layers of the rotor and the first and second yokes in the motor shown in FIG. 10.
Figure 16B:
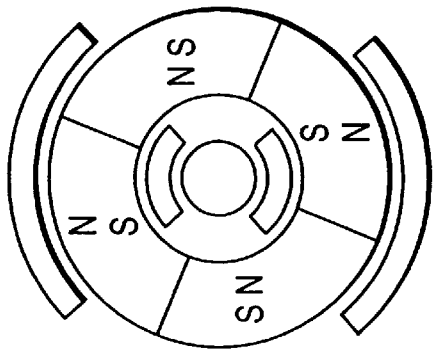

FIG. 12 is a magnified perspective view of the rotor, and FIGS. 13A, 13B, 14A, 14B, 15A, 15B, 16A and 16B show different rotational phases of the permanent magnet 1, wherein FIGS. 13A, 14A, 15A and 16A show the first magnetized layer while FIGS. 13B, 14B, 15B and 16B show the second magnetized layer. In case the third yoke 7 is constructed as an integral component as in the third embodiment shown in FIG. 11, there will result a communication of the magnetic flux between the first magnetized layer C and the second magnetized layer D of the permanent magnet 1 through the third yoke 7. Consequently, in the rotational positions of the permanent magnet 1 shown in FIGS. 13A, 13B and 15A, 15B, the force induced by cogging becomes stronger than in the rotational positions shown in FIGS. 14A, 14B and 16A, 16B. The phase of such stronger cogging appears four times in a turn, with a pitch of 90°. In case the currents to the coils 3, 4 are switched in succession in the present motor, one turn is achieved by eight switching operations, so that the electromagnetic force generated by the energization of the coils 3, 4 does not necessarily coincide with the cogging force.

For this reason, the generated driving force fluctuates significantly and the rotation does not become smooth. In the fourth embodiment, the first outer yoke 8 and the second outer yoke 9 are magnetically separated by the connection ring 10 of the non-magnetic material, so that the magnetic flux scarcely communicates between the first and second magnetized layers through the first and second outer yokes 8, 9, whereby the cogging is generated eight times in total, namely four times by the first magnetized layer at a pitch of 90° and four times by the second magnetized layer at a pitch of 90° in positions displaced in phase by 45°. As the cogging is thus generated at a pitch of 45°, the fluctuation in the generated driving force becomes small and there can be achieved smooth rotation.

In the fourth embodiment of the present invention, the permanent magnet 1 constituting the rotor is circumferentially divided into n sections and alternately magnetized as S and N poles not only on the external periphery of the permanent magnet 1 but also on the internal periphery thereof, but it is also possible, in the fourth embodiment, to circumferentially divide only the external periphery into n sections and alternately magnetize such sections as S and N poles.

According to the first to fourth embodiments of the present invention, as explained in the foregoing, there is provided a motor capable of obtaining an effective output by providing a permanent magnet which is formed in a hollow cylindrical shape and is provided with a first magnetized layer formed by circumferentially dividing at least the external periphery thereof into n sections and alternately magnetizing such sections as different magnetic poles, and a second magnetized layer, axially adjacent to the first magnetized layer and formed by circumferentially dividing at least the external periphery thereof into n sections with a phase displacement of 180°/n from the first magnetized layer and alternately magnetizing such sections as different magnetic poles, also providing a first coil, the above-mentioned permanent magnet and second coil in succession along the axial direction of the permanent magnet, positioning a first outer magnetic pole and a first inner magnetic pole, magnetized by the first coil, so as to respectively oppose the external and internal peripheries of the first magnetized layer of the permanent magnet, also positioning a second outer magnetic pole and a second inner magnetic pole, magnetized by the second coil, so as to respectively oppose the external and internal peripheries of the second magnetized layer of the permanent magnet, arranging the first outer magnetic pole and the second outer magnetic pole in such a manner that they are mutually opposed in the axial direction with a mutual phase displacement of 360°/n and such that the closest positions of the first and second outer magnetic poles form a gap of a large magnetic resistance. Also, as the first and second stators can be composed of a single component, there can be obtained a motor with easy assembling operation and reduced fluctuation in performance.

[Embodiment 5]

Figure 17:
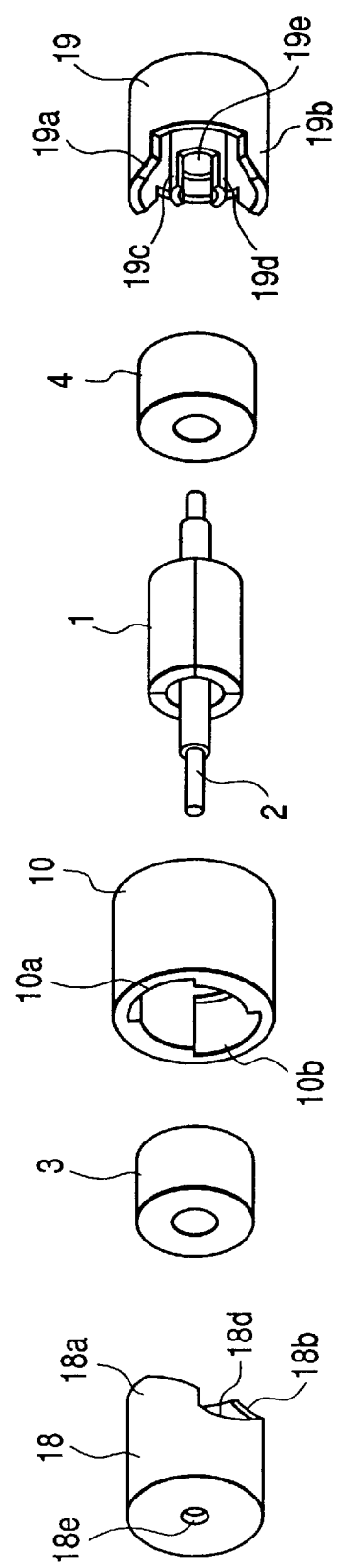
FIG. 17 is an exploded perspective view of a motor constituting a fifth embodiment of the present invention.
Figure 18:
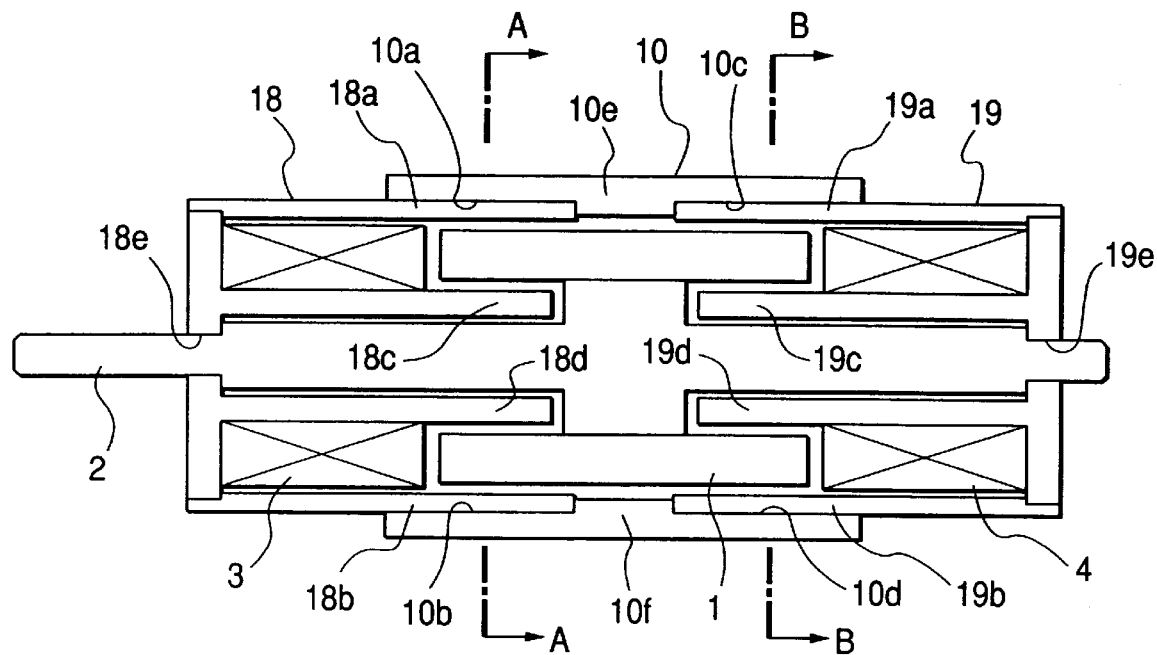
FIG. 18 is a cross-sectional view of the motor shown in FIG. 17 in the assembled state thereof.
Figure 20:
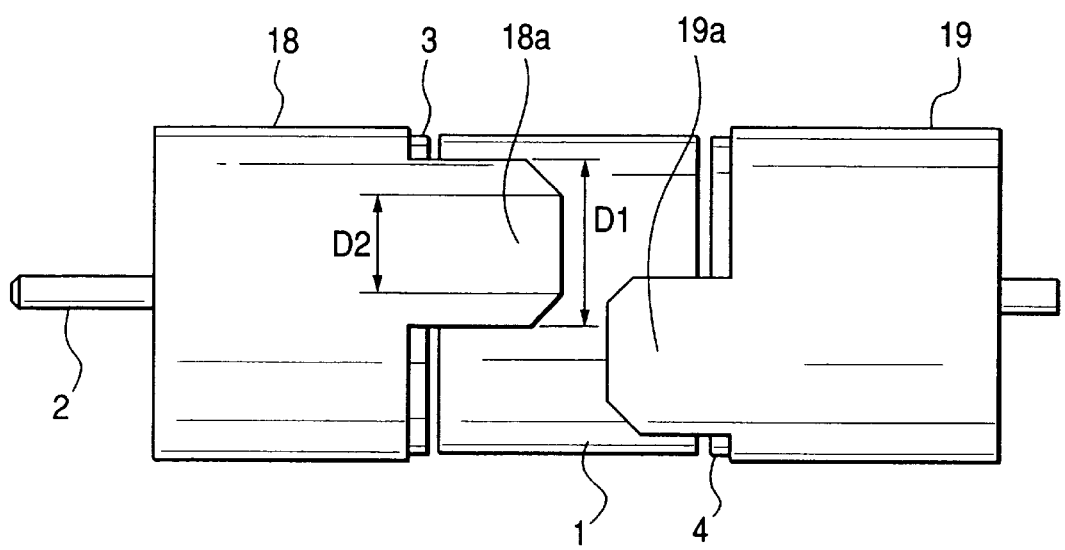
FIG. 20 is a view showing the stator and the rotor of the motor shown in FIG. 1.

FIGS. 17 to 20 illustrate a stepping motor constituting a fifth embodiment of the present invention, wherein FIG. 17 is an exploded perspective view of the stepping motor; FIG. 18 is an axial cross-sectional view of the stepping motor in the assembled state; FIGS. 19A to 19H are cross-sectional views along a line A—A or B—B in FIG. 18; and FIG. 20 is a plan view of the stepping motor with certain components removed.

Referring to these drawings, a cylindrical magnet 1 constituting the rotor is provided with a magnetized layer 1a, 1b, 1c, 1d formed by dividing the external periphery thereof into n sections (4 sections in the present embodiment) and alternately magnetizing such sections as S and N poles, wherein magnetized sections 1a, 1c are magnetized as S poles while those 1b, 1d are magnetized as N poles. An output shaft 2 constituting the rotor shaft is fixed to the magnet 1. The output shaft 2 and the magnet 1 constitute the rotor. Cylindrical coils 3, 4 are provided in positions concentric with and axially sandwiching the magnet 1. The coils 3, 4 have an external diameter substantially equal to that of the magnet 1.

First and second stators 18, 19 composed of a soft magnetic material are mutually displaced by a phase angle of 180°/n or 45°, and each of the first and second stators 18, 19 is composed of an outer tube and an inner tube. Between the outer and inner tubes of the first stator 18, there is provided the coil 3, which magnetizes the first stator 18 when energized. The outer tube and the inner tube of the first stator 18 form, at the ends thereof, outer magnetic poles 18a, 18*b* and inner magnetic poles 18*c*, 18*d*. The inner magnetic poles 18*c*, 18*d* are mutually displaced by 360°/(n/2)=180° so that they are assumed to be a same phase, and the outer magnetic pole 18*a* is opposed to the inner magnetic pole 18*c* while the outer magnetic pole 18*b* is opposed to the inner magnetic pole 18*d*.

The outer magnetic poles 18*a*, 18*b* and the inner magnetic poles 18*c*, 18*d* of the first stator 18 are provided so as to respectively oppose the external and internal peripheries of an end of the magnet 1, thereby sandwiching the above-mentioned end of the magnet 1. An end of the rotary shaft 2 is rotatably fitted in a hole 18*e* of the first stator 18.

Between the outer and inner tubes of the second stator 19, there is provided the coil 4, which magnetizes the second stator 19 when energized. The outer tube and the inner tube of the second stator 19 form, at the ends thereof, outer magnetic poles 19*a*, 19*b* and inner magnetic poles 19*c*, 19*d*. The inner magnetic poles 19*c*, 19*d* are mutually displaced by 360°/(n/2)=180° so that they are assumed to be the same phase, and the outer magnetic pole 19*a* is opposed to the inner magnetic pole 19*c* while the outer magnetic pole 19*b* is opposed to the inner magnetic pole 19*d*. The outer magnetic poles 19*a*, 19*b* and the inner magnetic poles 19*c*, 19*d* of the second stator 19 are provided so as to respectively oppose the external and internal peripheries of the other end of the magnet 1, thereby sandwiching the above-mentioned other end of the magnet 1. The other end of the rotary shaft 2 is rotatably fitted in a hole 19*e* of the second stator 19.

Consequently, the magnetic flux generated by the coil 3 crosses the magnet 1 constituting the rotor between the outer magnetic poles 18*a*, 18*b* and the inner magnetic poles 18*c*, 18*d*, thereby effectively acting on the magnet 1, while the magnetic flux generated by the coil 4 crosses the magnet 1 constituting the rotor between the outer magnetic poles 19*a*, 19*b* and the inner magnetic poles 19*c*, 19*d*, thereby effectively acting on the magnet 1, whereby the output of the motor can be elevated.

A cylindrical connection ring 10 of a non-magnetic material is provided, on the internal periphery thereof, with grooves 10*a*, 10*b* at an end and grooves 10*c*, 10*d* at the other end in positions displaced by 180°/n or 45° from the grooves 10*a*, 10*b*. The outer magnetic poles 18*a*, 18*b* of the first stator 18 are fitted in the grooves 10*a*, 10*b* while the outer magnetic poles 19*a*, 19*b* of the second stator 19 are fitted in the grooves 10*c*, 10*d*, and the fitted portions are fixed with an adhesive material, whereby the first and second stators 18, 19 are mounted on the connection ring 10. The first stator 18 and the second stator 19 are so positioned that the outer magnetic poles 18*a*, 18*b* and the inner magnetic poles 18*c*, 18*d* are opposed to the outer magnetic poles 19*a*, 19*b* and the inner magnetic poles 19*c*, 19*d*, and are fixed with a mutual distance defined by internal projections 10*e*, 10*f* of the connection ring 10.

FIG. 20 is a lateral view of the motor of the present embodiment, with the connection ring omitted. As shown in FIG. 20, the outer magnetic pole 18*a* and the unrepresented outer magnetic pole 18*b* of the first stator 18, and the outer magnetic pole 19*a* and the unrepresented outer magnetic pole 19*b* of the second stator 19 have a tapered shape, in which the width D2 at the end is smaller than the width D1 at the base portion. In such a configuration, the magnetic resistance between the outer magnetic pole 18*a* of the first stator 18 and the substantially opposed outer magnetic pole of the second stator 19 becomes larger than in a case where each outer magnetic pole has a flat end. Consequently the magnetic fluxes generated by the coils 3, 4 mutually influence each other less, whereby the rotation of the motor is stabilized and the output thereof is elevated.

Similarly the outer magnetic pole 18*b* of the first stator 18 and the outer magnetic pole 19*b* of the second stator 19, not illustrated in FIG. 20, also have a tapered shape in which the width D2 at the end is smaller than the width D1 at the base portion. Thus, the magnetic resistance between the outer magnetic pole 18*b* of the first stator 18 and the substantially opposed second stator 19 becomes larger than in the case where each outer magnetic pole has a flat end. Consequently the magnetic fluxes generated by the coils 3, 4 mutually influence each other less, whereby the rotation of the motor is stabilized and the output thereof is elevated.

As will be apparent from FIG. 20, the area, opposed to the magnet 1, of the outer magnetic poles 18*a*, 18*b* of the first stator 18 and the outer magnetic poles 19*a*, 19*b* of the second stator 19, is only slightly decreased by the portions cut off for obtaining the tapered shape. Consequently the output of the motor is decreased little by adopting such a shape and is increased larger by the decrease of mutual influence of the magnetic fluxes between the coils 3 and 4.

FIG. 18 is a cross-sectional view of the stepping motor, and FIGS. 19A to 19D are cross-sectional views along a line A—A in FIG. 18, while FIGS. 19E to 19H are cross-sectional views along a line B—B in FIG. 18.

FIGS. 19A and 19E are views at the same timing; FIGS. 19B and 19F are views at another same timing; FIGS. 19C and 19G are views at still another same timing; and FIGS. 19E and 19H are views at still another same timing.

In the following there will be explained the function of the stepping motor of the present invention. Starting from a state shown in FIGS. 19A and 19E, the coils 3, 4 are energized to magnetize the outer magnetic poles 18*a*, 18*b* of the first stator 18 as N poles, the inner magnetic poles 18*c*, 18*d* as S poles, the outer magnetic poles 19*a*, 19*b* of the second stator 19 as N poles and the inner magnetic poles 19*c*, 19*d* as S poles, whereby the permanent magnet 1 constituting the rotor rotates counterclockwise by 45° to assume a state shown in FIGS. 19B and 19F.

Then, the current to the coil 3 is inverted to magnetize the outer magnetic poles 18*a*, 18*b* of the first stator 18 as S poles, the inner magnetic poles 18*c*, 18*d* as N poles, the outer magnetic poles 19*a*, 19*b* of the second stator 19 as N poles and the inner magnetic poles 19*c*, 19*d* as S poles, whereby the magnet 1 constituting the rotor further rotates counterclockwise by 45° to assume a state shown in FIGS. 19C and 19G.

Then the current to the coil 4 is inverted to magnetize the outer magnetic poles 19*a*, 19*b* of the second stator 19 as S poles, the inner magnetic poles 19*c*, 19*d* as N poles, the outer magnetic poles 18*a*, 18*b* of the first stator 18 as S poles and the inner magnetic poles 18*c*, 18*d* as N poles, whereby the magnet 1 constituting the rotor further rotates counterclockwise by 45° to assume a state shown in FIGS. 19D and 19H. Thereafter the directions of the currents to the coils 3, 4 are similarly switched in succession whereby the magnet 1 rotates to positions corresponding to the phases of energization.

In the following there will be explained that the above-described configuration of the stepping motor is optimum for minimizing the dimension of the motor. The basic features of the stepping motor configuration are as follows:

1) the magnet is shaped as a hollow cylinder;
2) the external periphery of the magnet is circumferentially divided into n sections which are magnetized as alternately different magnetic poles;
3) the first coil, the magnet, and the second coil are arranged in this order in the axial direction of the magnet; and 4) the outer and inner magnetic poles of the first and second stators, magnetized by the first and second coils, are respectively opposed to the external and internal peripheries of the magnet.

Consequently, the present stepping motor only requires a diameter sufficient for mounting the magnetic poles of the stators in a mutually opposed manner on the external diameter of the magnet, and the axial length of the stepping motor is also limited to the length of the magnet and that of the first and second coils. Consequently, the dimension of this stepping motor is determined by the diameter and length of the magnet and the coils, and the stepping motor can be ultra miniaturized by reducing such diameter and length of the magnet and the coils to very small sizes.

The precision of the output of the stepping motor is difficult to maintain when the diameter and the length of the magnet and the coils are made very small, but such a drawback is avoided by a simple structure in which the magnet is formed into a hollow cylinder and the outer and inner magnetic poles of the first and second stators are provided in a mutually opposed manner on the external and internal peripheries of the magnet of such hollow cylindrical shape. In this configuration, the output of the motor can be further elevated by circumferentially magnetizing not only the external periphery, but also the internal periphery of the magnet, as will be described in the following Embodiment 6. The first and second stators 18, 19 are preferably formed by metal injection molding (MIM).

[Embodiment 6]

FIGS. 21A to 21H illustrate a sixth embodiment of the present invention.

In the foregoing fifth embodiment, the external periphery of the magnet 1 constituting the rotor is circumferentially divided into n sections which are alternately magnetized as S and N poles, but, in the present sixth embodiment, the magnet 1 is divided, not only on the external periphery but also on the internal periphery, into n sections (4 sections in the present embodiment) and alternately magnetized as S and N poles, whereby the output of the motor can be effectively increased. In this configuration, the polarity of the internal peripheral section is opposite to that of the external peripheral section adjacent thereto, so that, for example, the internal periphery of the magnetized sections 1a, 1c is magnetized as an N pole while that of the magnetized sections 1b, 1d is magnetized as an S pole. In the present second embodiment, since the magnet 1 is circumferentially divided, not only on the external periphery but also on the internal periphery, into n sections which are alternately magnetized as S and N poles, the output of the motor can be increased by the interaction between the internal periphery of the magnet 1 and the inner magnetic poles 18c, 18d of the first stator 18 and those 19c, 19d of the second stator 19.

[Embodiment 7]

Figure 22:
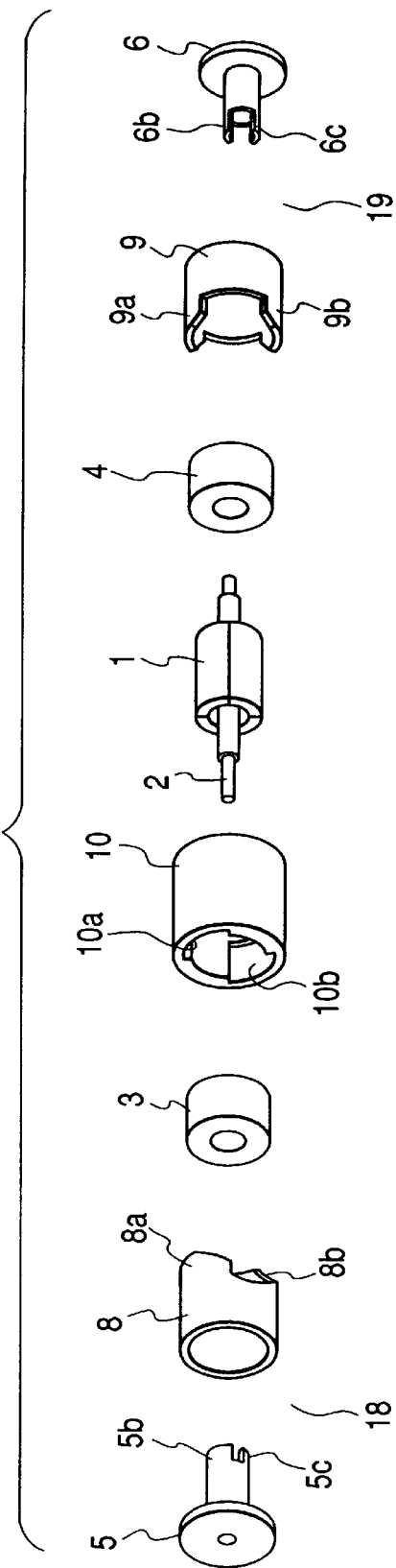
FIG. 22 is an exploded perspective view of a motor constituting a seventh embodiment of the present invention.

FIG. 22 illustrates a seventh embodiment of the present invention. In the foregoing fifth embodiment the outer and inner tubes are integrally formed in each of the first and second stators 18, 19, but, in the present seventh embodiment, the outer and inner tubes are separately formed in each of the first and second stators 18, 19 as shown in FIG. 22. More specifically, the inner tube of the first stator 18 constitutes a first yoke together with the inner magnetic poles 5b, 5c at the end, while the outer tube of the first stator 18 constitutes a third yoke together with the outer magnetic poles 8a, 8b at the end. Also the inner tube of the second stator 19 constitutes a second yoke together with the inner magnetic poles 6b, 6c at the end, while the outer tube of the second stator 19 constitutes a fourth yoke together with the outer magnetic poles 9a, 9b at the end. Also in the seventh embodiment, the output of the motor can be further increased effectively by circumferentially dividing not only the external periphery but also the internal periphery of the magnet 1, constituting the rotor, into n sections and alternately magnetizing such sections as S and N poles.

[Embodiment 8]

Figure 23:
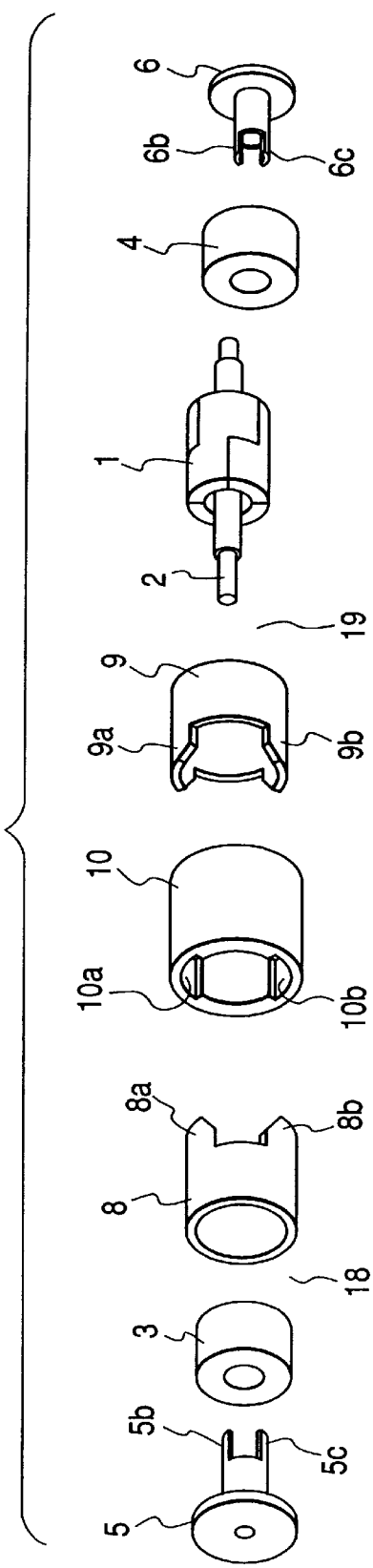
FIG. 23 is an exploded perspective view of a motor constituting an eighth embodiment of the present invention.
Figure 24:
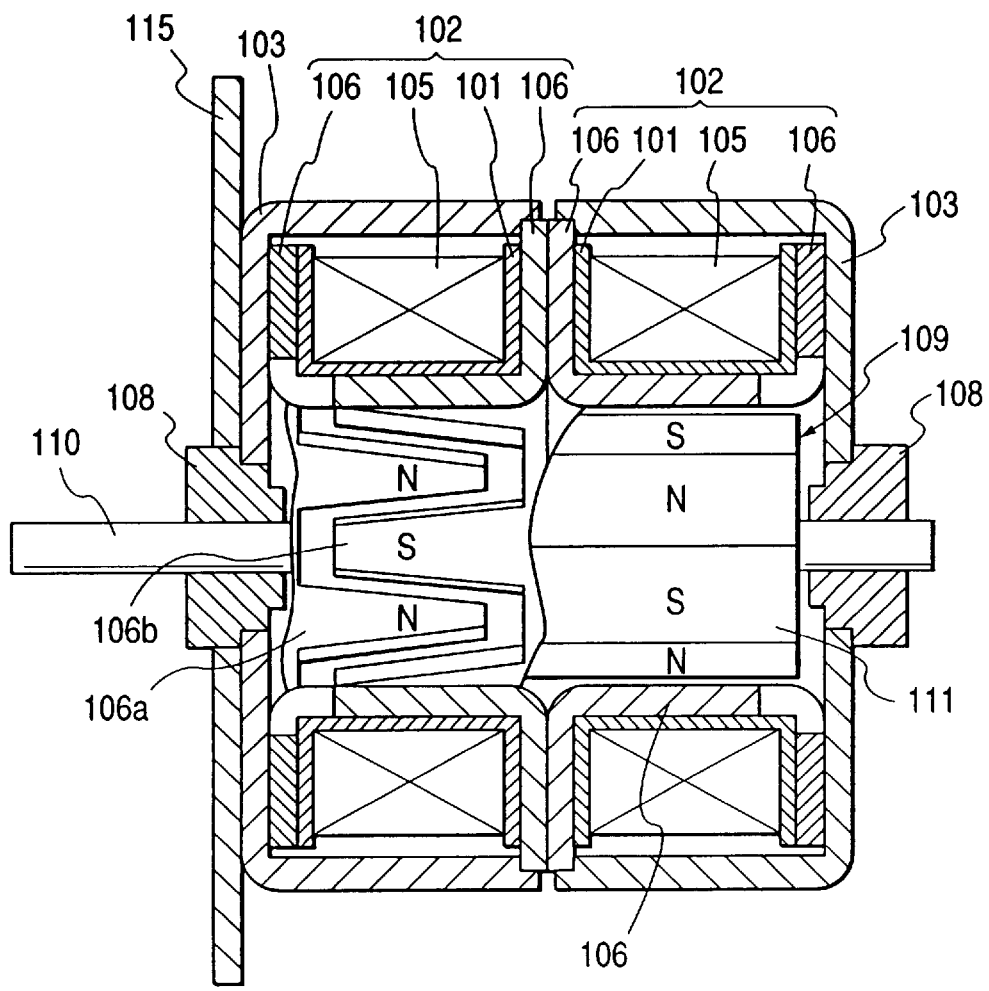
FIG. 24 is a cross-sectional view showing a conventional stepping motor.
Figure 25:
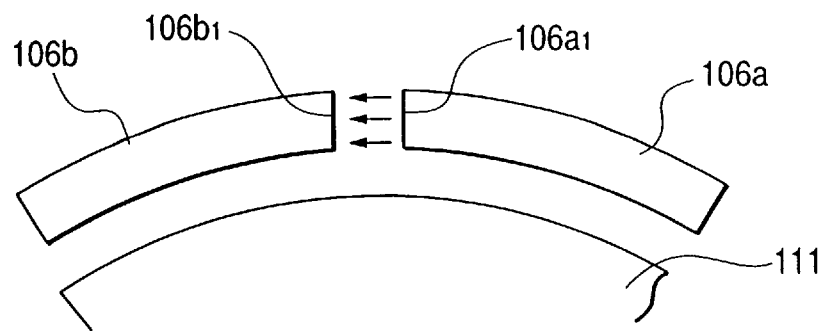
FIG. 25 is a view showing the magnetic flux of the conventional stepping motor shown in FIG. 24.

FIG. 23 illustrates an eighth embodiment which is applied to a motor in which the magnetized state of a permanent magnet 1 is displaced, by 180°/n or 45°, between a range opposed to a first stator 18 and a range opposed to a second stator 19, while the outer magnetic pole 18a of the first stator 18 and the outer magnetic pole 19a of the second stator 19 are mutually opposed without any mutual phase difference. These outer magnetic poles 8a, 8b, 9a, 9b also have a tapered end shaped to provide an effect similar to that in the fifth embodiment.

According to the fifth to eighth embodiment of the present invention, as explained in the foregoing, the outer magnetic poles of the first and second stators are formed in a tapered shape having a narrower width at the end, whereby these outer magnetic poles show a larger magnetic resistance therebetween to avoid the mutual influence between the first and second coils, whereby the rotation of the motor can be stabilized and the output thereof can be increased.

In the foregoing embodiments, the permanent magnet is so magnetized as to have four poles, but the present invention is by no means limited by such embodiments. More specifically, the number of magnetic poles of the permanent magnet may be selected to be larger than four, and, in such case, the number of the external and internal magnetic poles are increased accordingly.

The foregoing embodiments have been explained by a stepping motor, but the present invention is not limited to such embodiments and is likewise applicable to a brushless motor if the current supply is switched according to the rotor position, utilizing for example a Hall element.

What is claimed is:

1. A motor comprising:

a cylindrical magnet circumferentially divided, at least at the external periphery thereof, into n sections which are alternately magnetized as different magnetic poles;

a first oil and a second coil provided in the axial direction of and across said magnet;

a first outer magnetic pole magnetized by said first coil and opposed to the external periphery at an end of said magnet;

a first inner magnetic pole magnetized by said first coil and opposed to the internal periphery at an end of said magnet;

a second outer magnetic pole magnetized by said second coil and opposed to the external periphery of the other end of said magnet, wherein the end of said second outer magnetic pole is axially opposed to the end of said first outer magnetic pole, forming a gap to increase the magnetic resistance, thereby decreasing the leaking magnetic flux; and a second inner magnetic pole magnetized by said second coil and opposed to the internal periphery of the other end of said magnet.

2. A motor comprising:

a magnet formed cylindrically and including a first magnetized layer formed by circumferentially dividing, at least the external periphery thereof, into n sections which are alternately magnetized as different magnetic poles, and a second magnetized layer axially adjacent to said first magnetized layer, formed by circumferentially dividing, at least the external periphery thereof, into n sections which are displaced in phase by 180°/n and which are alternately magnetized as different magnetic poles;

a first coil and a second coil provided in the axial direction of and across said magnet;

a first yoke inserted in said first coil and having a first inner magnetic pole opposed to the internal periphery of the first magnetized layer of said magnet;

a second yoke inserted in said second coil and having a second inner magnetic pole opposed to the internal periphery of the second magnetized layer of said magnet; and a third yoke connected at an end thereof to said first yoke, covering the external surface of said first coil, and provided at the other with a first outer magnetic pole opposed to the external periphery of the first magnetized layer of said magnet;

a fourth yoke connected at an end thereof to said second yoke, covering the external surface of said second coil, and provided at the other with a second outer magnetic pole opposed to the external periphery of the second magnetized layer of said magnet;

wherein said second outer magnetic pole is provided in a position, rotationally displaced by a phase angle of 360°/n, with respect to said first outer magnetic pole; and a connection member for concentrically supporting said third yoke and said fourth yoke.

3. A motor comprising:

a magnet formed cylindrically and including a first magnetized layer formed by circumferentially dividing, at least the external periphery thereof, into n sections which are alternately magnetized as different magnetic poles, and a second magnetized layer axially adjacent to said first magnetized layer, formed by circumferentially dividing, at least the external periphery thereof, into n sections which are displaced in phase by 180°/n and which are alternately magnetized as different magnetic poles;

a first coil and a second coil provided in the axial direction of and across said magnet;

a first outer magnetic pole magnetized by said first coil and opposed to the external periphery at an end of said magnet;

a first inner magnetic pole magnetized by said first coil and opposed to the internal periphery at an end of said magnet;

a second outer magnetic pole magnetized by said second coil and opposed to the external periphery at the other end of said magnet, wherein the end of said second outer magnetic pole is axially opposed to the end of said first outer magnetic pole, with a displacement in phase by 360°/n therefrom, and the end of said second outer magnetic pole and the end of said first outer magnetic pole are formed in such a shape as to decrease the leaking magnetic flux; and a second inner magnetic pole magnetized by said second coil and opposed to the internal periphery at the other end of said magnet.

4. A motor comprising:

a magnet formed cylindrically and circumferentially divided, at least the external periphery thereof, into n sections which are alternately magnetized as different magnetic poles;

a first coil and a second coil provided in the axial direction of and across said magnet;

a first yoke inserted in said first coil and having a first inner magnetic pole opposed to the internal periphery of said magnet;

a second yoke inserted in said second coil and having a second inner magnetic pole opposed to the internal periphery of said magnet; and a third yoke covering the external surface of said first coil, the external surface of said magnet and the external surface of said second coil, and provided with a first outer magnetic pole opposed to the external periphery at an end of said magnet and a second outer magnetic pole opposed to the external periphery at the other end of said magnet;

wherein the end of said second outer magnetic pole is axially opposed, with a displacement in phase by 180°/n, to the end of said first outer magnetic pole, and the end of said second outer magnetic pole and the end of said first outer magnetic pole are formed in such a shape as to decrease the leaking magnetic flux.

5. A motor according to claim 1, wherein said magnet is circumferentially divided, on the internal periphery thereof, into n sections which are alternately magnetized as different magnetic poles and each of which is magnetized as a magnetic pole different from that of a magnetic pole adjacent thereto on the external periphery.

6. A motor comprising:

a cylindrical magnet including a first magnetized layer formed by circumferentially dividing at least the external periphery thereof into n sections which are alternately magnetized as different magnetic poles, and a second magnetized layer axially adjacent to said first magnetized layer, formed by circumferentially dividing at least the external periphery thereof into n sections which are displaced in phase by 180°/n and which are alternately magnetized as different magnetic poles; a first coil and a second coil provided in the axial direction of and across said magnet;

a first outer magnetic pole magnetized by said first coil and opposed to the external periphery of the first magnetized layer of said magnet;

a first inner magnetic pole magnetized by said first coil and opposed to the internal periphery of the first magnetized layer of said magnet;

a second outer magnetic pole magnetized by said second coil and opposed to the external periphery of the second magnetized layer of said magnet, wherein the end of said second outer magnetic pole is axially opposed to the end of said first outer magnetic pole, with a displacement in phase by 360°/n therefrom; and a second inner magnetic pole magnetized by said second coil and opposed to the internal periphery of the second magnetized layer of said magnet. according to claim 5, wherein the end of said second inner magnetic pole is axially opposed, with a displacement in phase by 360°/n, to the end of said first inner magnetic pole.

7. a motor according to claim 6, wherein said first outer magnetic pole and said first inner magnetic pole constitute a first stator, and said second outer magnetic pole and said second inner magnetic pole constitute a second stator.

8. A motor according to claim 7, wherein the first outer magnetic pole of said first stator and the second outer magnetic pole of said second stator are connected by a cylindrical connection member.

9. A motor according to claim 6, wherein said first and second coils are formed with a diameter substantially equal to that of said magnet.

10. A motor according to claim 6, wherein the internal periphery of the first and second magnetized layers of said magnet is circumferentially divided into n sections which are alternately magnetized as different magnetic poles and each of which is magnetized as a magnetic pole different from that of the adjacent external periphery.

11. A motor accordin to claim 7, wherein the internal periphery of the first and second magnetized layers of said magnet is circumferentially divided into n sections which are alternately magnetized as different magnetic poles and each of which is magnetized as a magnetic pole different from that of a magnetic pole adjacent thereto on the external periphery.

12. A motor comprising:
    a cylindrical magnet including a first magnetized layer formed by circumferentially dividing at least the external periphery thereof into n sections which are alternately magnetized as different magnetic poles, and a second magnetized layer axially adjacent to said first magnetized layer, formed by circumferentially dividing at least the external periphery thereof into n sections which are displaced in phase by 180°/n and which are alternately magnetized as different magnetic poles;
    a first coil and a second coil provided in the axial direction of and across said magnet;
    a first yoke inserted in said first coil and having a first inner magnetic pole opposed to the internal periphery of the first magnetized layer of said magnet;
    a second yoke inserted in said second coil and having a second inner magnetic pole opposed to the internal periphery of the second magnetized layer of said magnet; and
    a third yoke covering the external surface of said first coil, the external surface of said magnet, and the external surface of second coil, having a first outer magnetic pole opposed to teh external periphery of the first magnetized layer of said magnet and a second outer magnetic pole opposed to the external periphery of the second magnetized layer of said magnet,
    wherein said second outer magnetic pole is provided at a position, rotationally displaced by a phase angle of 360°/n, with respect to said first outer mangetic pole.

13. A motor comprising:
    a cylindrical magnet including a first magnetized layer formed by circumferentially dividing at least the external periphery thereof into n sections which are alternately magnetized as different magnetic poles, and a second magnetized layer axially adjacent to said first magnetized layer, formed circumferentially dividing at least the external periphery thereof into n sections, which are displaced in phase by 180°/ n and which are alternately magnetized as different magnetic poles;
    a first coil and a second coil provided in the axial direction of and across said magnet;
    a first yoke inserted in said first coil and having a first inner magnetic pole opposed to the internal periphery of the first magnetized layer of said magnet;
    a second yoke inserted in said second coil and having a second inner magnetic pole opposed to the internal periphery of the second magnetized layer of said magnet; and
    a third yoke connected at one end thereof to siad first yoke, covering the external surface of said first coil, and provided at the other end with a first outer magnetic pole opposed to the external periphery of the first magnetized layer of said magnet;
    a fourth yoke connected at one end thereof to said second yoke, covering the external surface of said second coil, and provided at the other end with a second outer magnetic pole opposed to the external periphery of the second magnetized layer of said magnet,
    wherein said second outer magnetic pole is provided at a position rotationally displaced by a phase angle 360°/n, with respect to said first outer magnetic pole; and
    a connection member for concentrically supporting said third yoke and said fourth yoke.

14. A motor comprising:
    a cylindrical magnet circumferentially divided, at least at the external periphery thereof, into n sections which are alternately magnetized as different magnetic poles;
    a first coil provided in the axial direction of and across said magnet;
    a first outer magnetic pole magnetized by said first coil and opposed to the external periphery of an end of said magnet;
    a first inner magnetic pole magnetized by said first coil and opposed to the internal periphery of an end of said magnet;
    a second outer magnetic pole magnetized by said second coil and opposed to the external periphery of the outer end of said magnet, wherein the end of said second outer magnetic pole and the end of said first outer magnetic pole are formed in such a shape as to decrease the leaking magnetic flux and are mutually opposed in the axial direction; and
    a second inner magnetic pole magnetized by said second coil and opposed to the internal periphery of the other end of said magnet.

15. A motor according to claim 1, wherein said magnet is circumferentially divided, on the internal periphery thereof, into n sections which are alternately magnetized as different magnetic poles and each of which is magnetized as a magnetic pole different from that of the adjacent external periphery.

16. A motor comprising:
    a magnet formed cylindrically and circumferentially divided, at least the external periphery thereof, into n sections which are alternately magnetized as different magnetic poles;
    a first coil and a second coil provided in the axial direction of and across said magnet;
    a first outer magnetic pole magnetized by said first coil and opposed to the external periphery at an end of said magnet;
    a first inner magnetic pole magnetized by said first coil and opposed to the internal periphery at an end of said magnet;
    a second outer magnetic pole magnetized by said second coil and opposed to the external periphery of the other end of said magnet, wherein the end of said second outer magnetic pole and the end of said first outer magnetic pole are formed in such a shape as to decrease the leaking magnetic flux and are mutually opposed in the axial direction; and
    a second inner magnetic pole magnetized by said second coil and opposed to the internal periphery of the other end of said magnet.

17. A motor according to claim 16, wherein said magnet is circumferentially divided on the internal periphery thereof into n sections, which are alternately magnetized as different magnetic poles and each of which is magnetized as a magnetic pole different from that of an adjacent magnetic pole on the external periphery of said magnet.

18. A motor according to claim 17, wherein said first outer magnetic pole and said first inner magnetic pole constitute a first stator, and said second outer magnetic pole and said second inner magnetic pole constitute a second stator.

19. A motor according to claim 18, wherein said magnet is circumferentially divided, on the internal periphery thereof, into n sections which are alternately magnetized as different magnetic poles and each of which is magnetized as a magnetic pole different from that of the adjacent external periphery.

20. A motor according to claim 18, wherein said first stator includes an outer tube and an inner tube in which said first outer magnetic pole is formed at the end of said outer tube while said first inner magnetic pole is formed at the end of said inner tube, and said second stator also includes an outer tube and an inner tube in which said second outer magnetic pole is formed at the end of said outer tube while said second inner magnetic pole is formed at the end of said inner tube.

21. A motor comprising:
a cylindrical magnet including a first magnetized layer formed by circumferentially dividing at least the external periphery thereof into n sections, which are alternately magnetized as different magnetic poles, and a second magnetized layer axially adjacent to said first magnetized layer, formed by circumferentially dividing at least the external periphery thereof into n sections which are displaced in phase by 180°/n and which are alternately magnetized as different magnetic poles;
a first coil and a second coil provided in the axial direction of and across said magnet;
a first outer magnetic pole magnetized by said first coil and opposed to the external periphery at an end of said magnet;
a first inner magnetic pole magnetized by said first coil and opposed to the internal periphry at an end of said magnet;
a second outer magnetic pole magnetized by said second coil and opposed to the external periphery of the other end of said magnet, wherein the end of said second outer magnetic pole is axially opposed to the end of said first outer magnetic pole, with a displacement in phase by 360°/n therefrom, and the end of said second outer magnetic pole and the end of said first outer magnetic pole are formed in such a shape as to decrease the leaking magnetic flux; and
a second inner magnetic pole magnetized by said second coil and opposed to the internal periphery of the other end of said magnet.

22. A motor comprising:
a cylindrical magnet circumferentially divided at least at the external periphery thereof into n sections which are alternately magnetized as different magnetic poles;
a first coil and a second coil provided in the axial direction of and across said magnet;
a first yoke inserted in said coil and having a first inner magnetic pole opposed to the internal periphery of said magnet;
a second yoke inserted in said second coil and having a second inner magnetic pole opposed to the internal periphery of said magnet; and
a third yoke covering the external surface of said first coil, the external surface of said magnet, and the external surface of said second coil, and provided with a first outer magnetic pole opposed to the external periphery of an end of said magnet and a second outer magnetic pole opposed to the external periphery of the other end of said magnet;
wherein the end of said second outer magnetic pole is axially opposed, with a displacement in phase by 180°/n, to the end of said first outer magnetic pole, and the end of said second outer magnetic pole and the end of said first outer magnetic pole are formed in such a shape as to decrease the leaking magnetic flux.

23. A motor comprising:
a cylindrical magnet including a first magnetized layer formed by circumferentially dividing at least the external periphery thereof into n sections which are alternately magnetized as different magnetic poles, and a second magnetized layer axially adjacent to said first magnetized layer, formed by circumferentially dividing at least the external periphery thereof into n sections which are displaced in phase by 180°/n and which are alternately magnetized as different magnetic poles;
a first coil and a second coil provided in the axial direction of and across said magnet;
a first yoke inserted in said first coil and having a first inner magnetic pole opposed to the internal periphery of the first magnetized layer of said magnet;
a second yoke inserted in said second coil and having a second inner magnetic pole opposed to the internal periphery of the second magnetized layer of said magnet;
a third yoke connected at an end thereof to said first yoke, covering the external surface of said first coil, and provided at the other end with a first outer magnetic pole opposed to the external periphery of the first magnetized layer of said magnet; and
a fourth yoke connected at an end thereof to said second yoke, covering the external surface of said second coil, and provided at the other end with a second outer magnetic pole opposed to the external periphery of the second magnetized layer of said magnet,
wherein the end of said second outer magnetic pole is axially opposed, with a displacement in phase by 180°/n, to the end of said first outer magnetic pole, and the end of said second outer magnetic pole and the end of said first outer magnetic pole are formed in such a shape as to decrease the leaking magnetic flux; and
a connection member for concentrically supporting said third yoke and said fourth yoke.

* * * * *

UNITED STATES PATENT AND TRADEMARK OFFICE
CERTIFICATE OF CORRECTION

PATENT NO.     : 6,081,053
DATED          : June 27, 2000
INVENTOR(S)    : Maegawa et al.

It is certified that error appears in the above-identified patent and that said Letters Patent is hereby corrected as shown below:

Title Page,
Item [56], References Cited, FOREIGN PATENT DOCUMENTS "3180823" should read -- 3-180823 --.

Column 5,
Line 7, "poles" (first occurrence) should read -- poles, --.

Column 14,
Line 44, "oil" should read -- coil --.
Line 62, "comprising" should read -- according to claim 1, --.
Lines 63-66, delete in their entirety.

Column 15,
Lines 1-31, delete in their entirety and insert -- wherein the axially opposed arrangement of the end of said second outer magnetic pole and the end of said first outer magnetic pole for decreasing the leaking magnetic flux is achieved by the formation of a gap by placing said ends in positions mutually displaced by a predetermined phase angle so as to increase the magnetic resistance. --.
Line 32, "comprising" should read -- according to claim 2 --.
Lines 33-62, delete in their entirety and insert -- wherein the end of said second inner magnetic pole and the end of said first inner magnetic pole are axially opposed with a mutual displacement by a predetermined phase angle so as to decrease the leaking magnetic flux. --.
Line 63, "comprising" should read -- according to claim 1 --.
Lines 64 and 65, delete in their entirely.

Column 16,
Lines 1-23, delete in their entirety and insert -- wherein said first outer magnetic pole and said first inner magnetic pole constitute a first stator, while said second outer magnetic pole and said second inner magnetic pole constitute a second stator, and said first outer magnetic pole and said second outer magnetic pole are connected by a cylindrical connection member. --.
Line 40, "a" should read -- ¶a --.
Line 56, delete "according to claim 5,".
Lines 57-59, delete in their entirety.
Line 60, "a" should read -- A --, and "said first outer" should read -- the end --.

UNITED STATES PATENT AND TRADEMARK OFFICE
CERTIFICATE OF CORRECTION

PATENT NO. : 6,081,053
DATED : June 27, 2000
INVENTOR(S) : Maegawa et al.

It is certified that error appears in the above-identified patent and that said Letters Patent is hereby corrected as shown below:

Column 16, (cont.)
Lines 61-63, delete in their entirety and insert -- of said second inner magnetic pole is axially opposed, with a displacement in phase by 360°/n, to the end of said first inner magnetic pole. --
Line 64, "the" should read -- said --.
Line 65, deleted in its entirety and insert -- magnetic pole and said first inner magnetic pole constitute a first stator, and said second outer magnetic pole and said second inner magnetic pole constitute a second stator. --

Column 17,
Lines 1 and 2, delete in their entirety.
Line 3, "claim 6, wherein said first and" should read -- claim 8, wherein the --.
Lines 4 and 5, delete in their entirety and insert -- first outer magnetic pole of said first stator and the second outer magnetic pole of said second stator are connected by a cylindrical connection member.--.
Line 6, "claim 6, wherein the internal" should read -- claim 7, wherein said --.
Lines 7-11, delete in their entirety and insert -- first and second coils are formed with a diameter substantially equal to that of said magnet. --.
Line 12, "accordin" should read -- according --.
Line 41, "teh" should read -- the --.

Column 18,
Line 1, "siad" should read -- said --.
Line 20, "coil" should read -- coil and a second coil --.
Line 38, "claim 1, wherein said magnet is" should read -- claim 14, wherein the --.
Lines 39-43, delete in their entirety and insert -- end of said first outer magnetic pole and the end of said second outer magnetic pole are formed in such a tapered shape as to increase the magnetic resistance of said motor. --.
Line 44, "comprising" should read -- according to claim 15, wherein said --.
Lines 45-66, delete in their entirety and insert -- first outer magnetic pole and said first inner magnetic pole constitute a first stator, and said second outer magnetic pole and said second inner magnetic pole constitute a second stator. --.

UNITED STATES PATENT AND TRADEMARK OFFICE
CERTIFICATE OF CORRECTION

PATENT NO. : 6,081,053
DATED : June 27, 2000
INVENTOR(S) : Maegawa et al.

It is certified that error appears in the above-identified patent and that said Letters Patent is hereby corrected as shown below:

Column 19,
Lines 7-10, delete in their entirety and insert -- A motor according to Claim 16, wherein said first stator includes an outer tube and an inner tube, wherein said first outer magnetic pole is formed at the end of said outer tube while said first inner magnetic pole is formed at the end of said inner tube, and said second stator also includes an outer tube and an inner tube, wherein said second outer magnetic pole is formed at the end of said outer tube while said second inner magnetic pole is formed at the end of said inner tube. --.
Lines 11-16, delete in their entirety and insert -- A motor according to Claim 18, wherein, in each of said first and second stators, the outer tube and the inner tube are integrally formed. --.
Lines 17-25, delete in their entirety and insert -- A motor according to Claim 18, wherein, in each of said first and second stators, the outer tube and the inner tube are formed separately and are mutually fixed. --.

Column 20,
Line 1, "coil" should read -- first coil --.

Signed and Sealed this

Fifth Day of August, 2003

JAMES E. ROGAN
*Director of the United States Patent and Trademark Office*